(12) United States Patent
Hayakawa

(10) Patent No.: US 7,280,286 B2
(45) Date of Patent: Oct. 9, 2007

(54) ZOOM LENS SYSTEM

(75) Inventor: Satoshi Hayakawa, Ichikawa (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 11/513,123

(22) Filed: Aug. 31, 2006

(65) Prior Publication Data

US 2007/0070521 A1    Mar. 29, 2007

(30) Foreign Application Priority Data

Sep. 28, 2005   (JP)   ............................. 2005-282918

(51) Int. Cl.
*G02B 15/14* (2006.01)

(52) U.S. Cl. ....................... 359/686; 359/684; 359/685; 359/714; 359/740; 359/766

(58) Field of Classification Search ........ 359/683–686, 359/714, 740, 766
See application file for complete search history.

(56) References Cited

U.S. PATENT DOCUMENTS

| | | | | |
|---|---|---|---|---|
| 5,956,184 | A * | 9/1999 | Sato | 359/683 |
| 5,978,150 | A * | 11/1999 | Hamanishi et al. | 359/683 |
| 6,025,962 | A * | 2/2000 | Suzuki | 359/766 |
| 6,236,516 | B1 * | 5/2001 | Misaka | 359/690 |
| 6,483,648 | B1 * | 11/2002 | Yamanashi | 359/683 |
| 6,631,034 | B2 * | 10/2003 | Yamanashi | 359/684 |
| 7,133,213 | B2 * | 11/2006 | Hayakawa | 359/686 |
| 7,151,637 | B2 * | 12/2006 | Tochigi et al. | 359/685 |
| 7,209,299 | B2 * | 4/2007 | Aoki | 359/683 |
| 7,218,458 | B2 * | 5/2007 | Saruwatari | 359/686 |
| 2002/0063970 | A1 * | 5/2002 | Uzawa et al. | 359/689 |
| 2003/0165020 | A1 * | 9/2003 | Satori et al. | 359/686 |
| 2005/0275949 | A1 * | 12/2005 | Fujimoto et al. | 359/685 |
| 2006/0066954 | A1 * | 3/2006 | Sato | 359/686 |
| 2006/0152816 | A1 * | 7/2006 | Kuroda et al. | 359/684 |
| 2006/0203356 | A1 * | 9/2006 | Fujimoto et al. | 359/685 |

FOREIGN PATENT DOCUMENTS

| | | |
|---|---|---|
| JP | 11-258506 A | 9/1999 |
| JP | 2004-233750 A | 8/2004 |

* cited by examiner

*Primary Examiner*—Evelyn A. Lester
(74) *Attorney, Agent, or Firm*—Miles & Stockbridge PC

(57) ABSTRACT

Providing a zoom lens system that can excellently correct aberrations over entire range from a wide-angle end state W to a telephoto end state T in spite of having a high zoom ratio including, in order from an object, a first group G1 having positive power, a second group G2 having negative power, a third group G3 having positive power, a fourth group G4 having negative power, and a fifth group G5 having positive power. When zooming from the wide-angle end state W to the telephoto end state T, a distance between the first group G1 and the second group G2 increases, a distance between the second group G2 and the third group G3 decreases, a distance between the third group G3 and the fourth group G4 increases, and a distance between the fourth group G4 and the fifth group G5 decreases. Given conditions are satisfied.

16 Claims, 14 Drawing Sheets

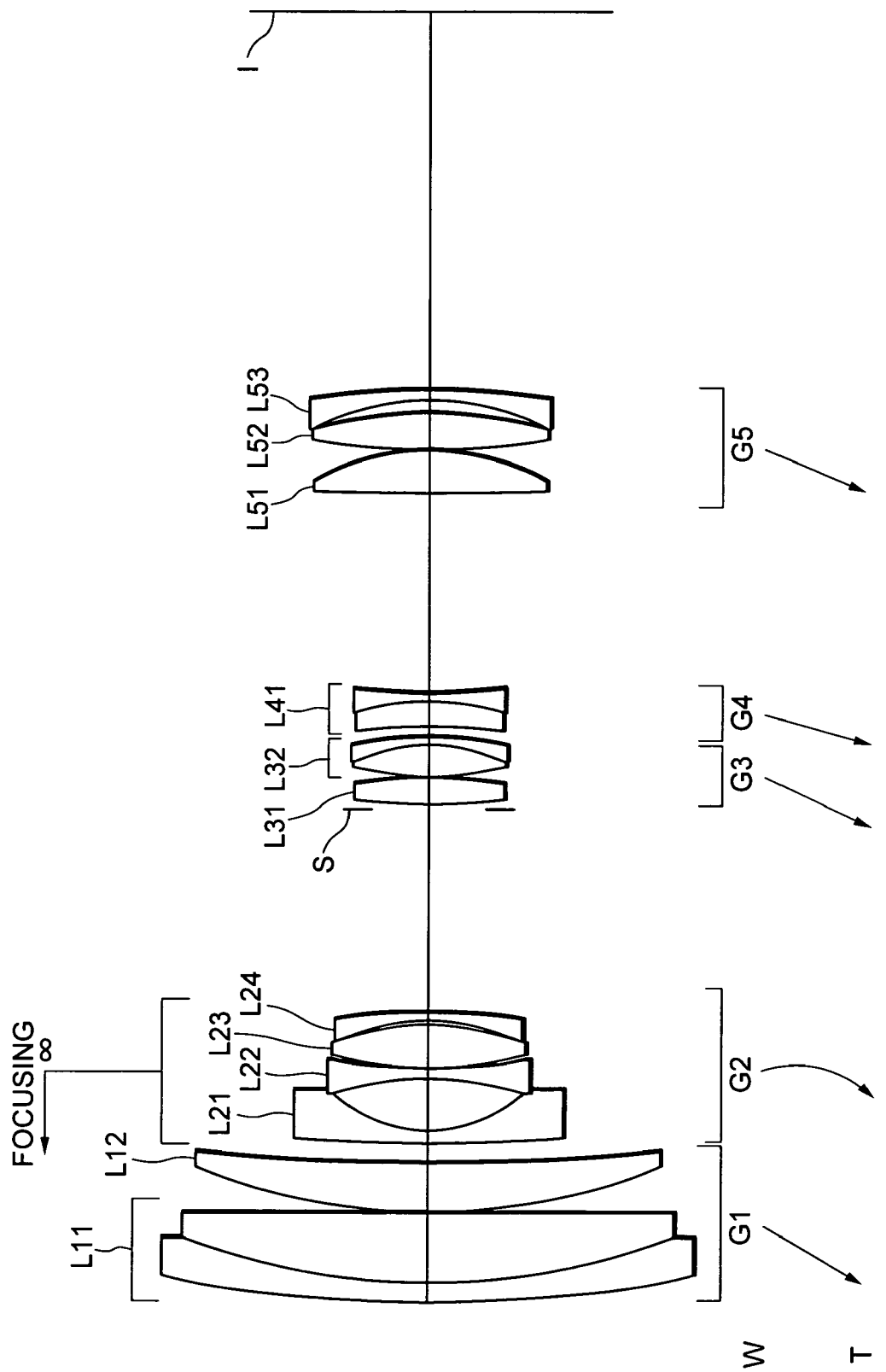

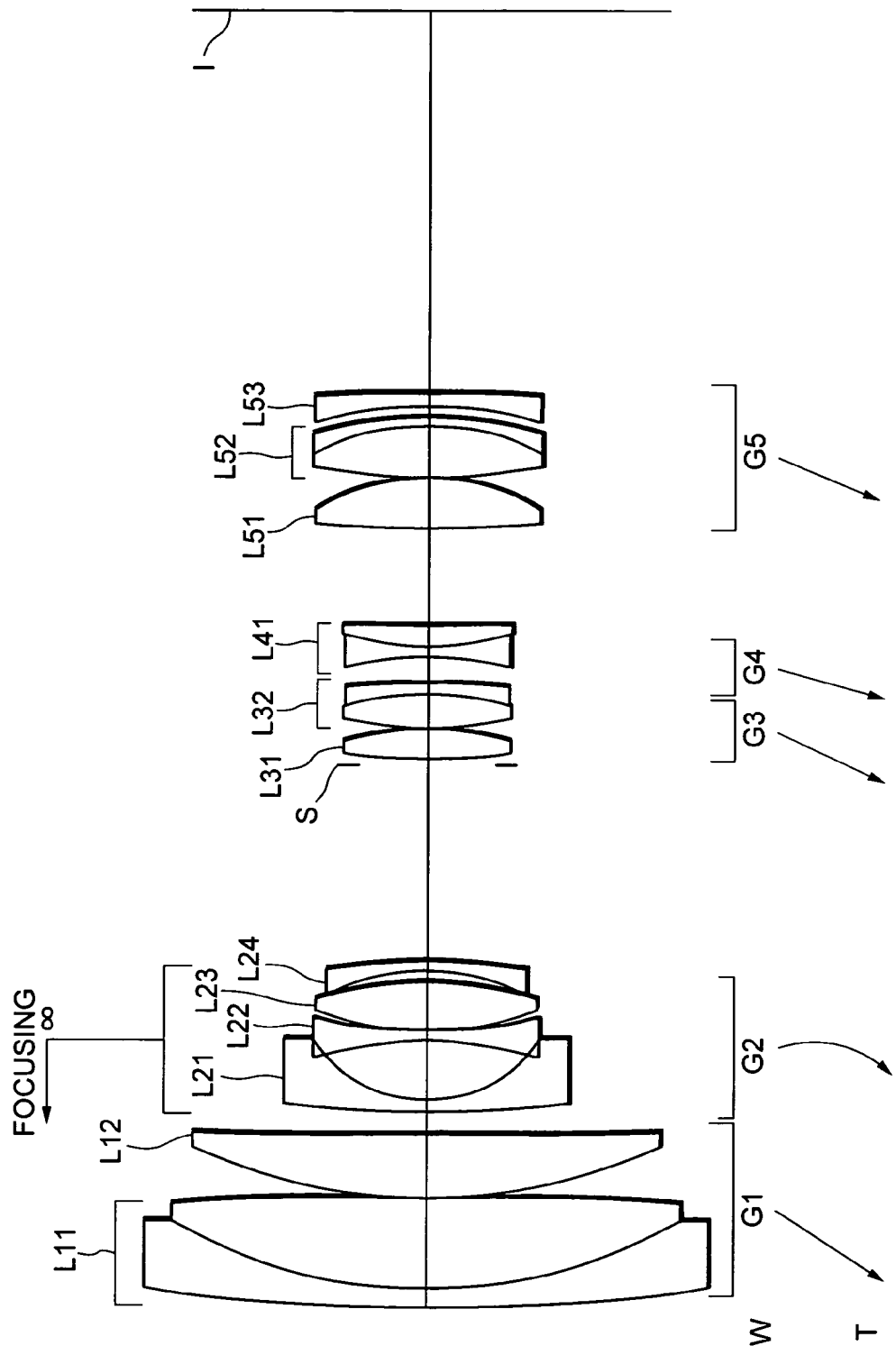

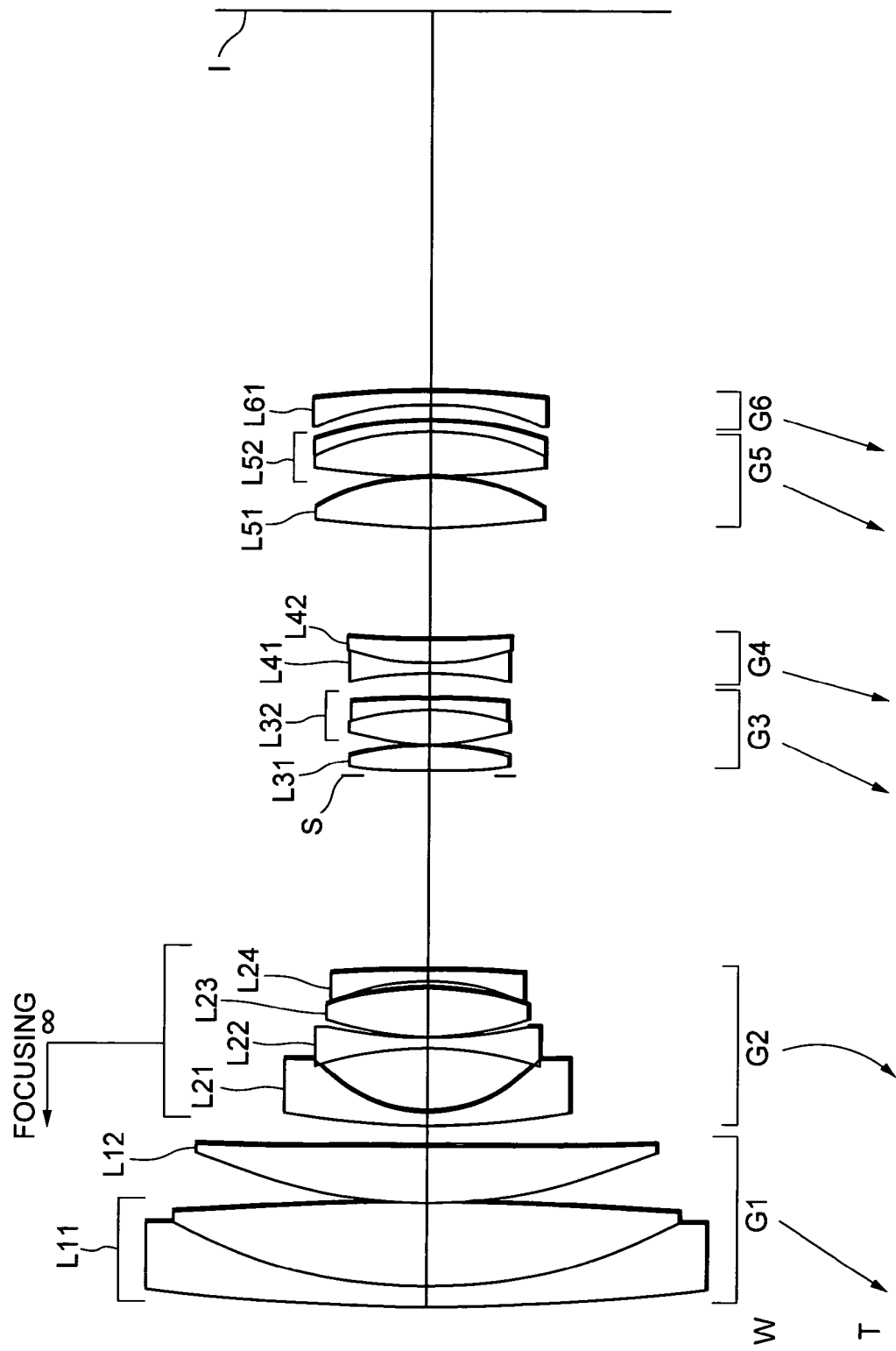

ZOOM LENS SYSTEM

The disclosure of the following priority application is herein incorporated by reference:

Japanese Patent Application No. 2005-282918 filed on Sep. 28, 2005.

BACKGROUND OF THE INVENTION

1. Field of the Invention

The present invention relates to a zoom lens system suitable for a single-lens reflex camera.

2. Related Background Art

In a zoom lens system suitable for a high zoom ratio, there has been widely known a five-group type zoom lens composed of, in order from an object, positive, negative, positive, negative, and positive lens groups shown in such as Japanese Patent Application Laid-Open Nos. 11-258506 and 2004-233750.

However, in a zoom lens system disclosed in Japanese Patent Application Laid-Open No. 11-258506, since a combined focal length of the first lens group and the second lens group is large with respect to a moving amount of the first lens group upon varying a state of lens group positions from a wide-angle end state to a telephoto end state, it has become difficult to correct aberrations.

Moreover, in a zoom lens system disclosed in Japanese Patent Application Laid-Open No. 2004-233750, since a moving amount of the first lens group upon varying a state of lens group positions from a wide-angle end state to a telephoto end state is not sufficient, when a zoom lens system having a further high zoom ratio is to be configured, curvature of field cannot have been sufficiently corrected over entire focal length range from the wide-angle end state to the telephoto end state.

SUMMARY OF THE INVENTION

The present invention is made in view of the aforementioned problems and has an object to provide a zoom lens system that can excellently correct aberrations over entire focal length range from a wide-angle end state to a telephoto end state in spite of a high zoom ratio.

According to a first aspect of the present invention, there is provided a zoom lens system including, in order from an object, a first lens group having positive refractive power, a second lens group having negative refractive power, a third lens group having positive refractive power, a fourth lens group having negative refractive power, and a fifth lens group having positive refractive power. When a state of lens group positions varies from a wide-angle end state to a telephoto end state, a distance between the first lens group and the second lens group increases, a distance between the second lens group and the third lens group decreases, a distance between the third lens group and the fourth lens group increases, and a distance between the fourth lens group and the fifth lens group decreases. The following conditional expression is satisfied:

$$-0.37 < f12W/X1 < -0.20$$

where f12W denotes a combined focal length of the first lens group and the second lens group in the wide-angle end state focusing on infinity, and X1 denotes a moving amount of the first lens group upon zooming from the wide-angle end state to the telephoto end state.

In the first aspect of the present invention, the following conditional expression is preferably satisfied:

$$2.32 < X1/fW$$

where fW denotes a focal length of the zoom lens system in the wide-angle end state.

In the first aspect of the present invention, the third lens group is preferably composed of, in order from the object, a positive lens element, a positive lens element and a negative lens element.

In the first aspect of the present invention, it is preferable that the first lens group includes, in order from the object, a cemented lens, and a positive lens.

In the first aspect of the present invention, it is preferable that the second lens group includes, in order from the object, a negative lens, a negative lens, a positive lens, and a negative lens.

In the first aspect of the present invention, it is preferable that the fourth lens group includes a positive lens and a negative lens.

In the first aspect of the present invention, it is preferable that the fifth lens group includes, in order from the object, a positive lens, a positive lens, and a negative lens.

In the first aspect of the present invention, it is preferable that an aperture stop is disposed between the second lens group and the third lens group.

In the first aspect of the present invention, it is preferable that at least one surface of the second lens group is an aspherical surface.

In the first aspect of the present invention, it is preferable that at least one surface of the fifth lens group is an aspherical surface.

In the first aspect of the present invention, it is preferable that the third lens group and the fifth lens group are moved along the same moving trajectory upon zooming from the wide-angle end state to the telephoto end state.

In the first aspect of the present invention, it is preferable that focusing from infinity to a close object is carried out by moving the second lens group to the object side.

According to a second aspect of the present invention, there is provided a method for forming an image of an object and varying a focal length of a zoom lens system that includes, in order from the object, a first lens group having positive refractive power, a second lens group having negative refractive power, a third lens group having positive refractive power, a fourth lens group having negative refractive power, and a fifth lens group having positive refractive power, comprising steps of, varying the focal length by increasing a distance between the first lens group and the second lens group, decreasing a distance between the second lens group and the third lens group, increasing a distance between the third lens group and the fourth lens group, and decreasing a distance between the fourth lens group and the fifth lens group when the zoom lens system moves from a wide-angle end state to a telephoto end state, and satisfying the following conditional expression:

$$-0.37 < f12W/X1 < -0.20$$

where f12W denotes a combined focal length of the first lens group and the second lens group in the wide-angle end state upon focusing on infinity, and X1 denotes a moving amount of the first lens group upon zooming from the wide-angle end state to the telephoto end state.

In the second aspect of the present invention, the following step is preferably included:
satisfying the following conditional expression:

$$2.32 < X1/fW$$

where fW denotes a focal length of the zoom lens system in the wide-angle end state.

In the second aspect of the present invention, the following step is preferably included:
providing the third lens group composed of, in order from the object, a positive lens element, a positive lens element and a negative lens element.

Other features and advantages according to the present invention will be readily under stood from the detailed description of the preferred embodiments in conjunction with the accompanying drawings.

BRIEF DESCRIPTION OF THE DRAWINGS

FIG. 1 is a diagram showing a lens configuration of a zoom lens system according to Example 1.

FIGS. 2A, 2B, and 2C are graphs showing various aberrations of the zoom lens system according to Example 1 focusing on infinity in which FIG. 2A shows various aberrations in a wide-angle end state (f=16.5 mm), FIG. 2B shows various aberrations in an intermediate focal length state (f=50.0 mm), and FIG. 2C shows various aberrations in a telephoto end state (f=131.0 mm).

FIGS. 4A, 4B, and 4C are graphs showing various aberrations of the zoom lens system according to Example 2 focusing on infinity in which FIG. 4A shows various aberrations in a wide-angle end state (f=18.5 mm), FIG. 4B shows various aberrations in an intermediate focal length state (f=50.0 mm), and FIG. 4C shows various aberrations in a telephoto end state (f=131.0 mm).

FIGS. 6A, 6B, and 6C are graphs showing various aberrations of the zoom lens system according to Example 3 focusing on infinity in which FIG. 6A shows various aberrations in a wide-angle end state (f=18.5 mm), FIG. 6B shows various aberrations in an intermediate focal length state (f=50.0 mm), and FIG. 6C shows various aberrations in a telephoto end state (f=131.0 mm).

FIG. 7 is a diagram showing a lens configuration of a zoom lens system according to Example 4.

FIGS. 8A, 8B, and 8C are graphs showing various aberrations of the zoom lens system according to Example 4 focusing on infinity in which FIG. 8A shows various aberrations in a wide-angle end state (f=18.5 mm), FIG. 8B shows various aberrations in an intermediate focal length state (f=50.0 mm), and FIG. 8C shows various aberrations in a telephoto end state (f=131.0 mm).

FIGS. 10A, 10B, and 10C are graphs showing various aberrations of the zoom lens system according to Example 5 focusing on infinity in which FIG. 10A shows various aberrations in a wide-angle end state (f=18.5 mm), FIG. 10B shows various aberrations in an intermediate focal length state (f=50.0 mm), and FIG. 10C shows various aberrations in a telephoto end state (f=131.0 mm).

FIGS. 12A, 12B, and 12C are graphs showing various aberrations of the zoom lens system according to Example 6 focusing on infinity in which FIG. 12A shows various aberrations in a wide-angle end state (f=18.5 mm), FIG. 12B shows various aberrations in an intermediate focal length state (f=50.0 mm), and FIG. 12C shows various aberrations in a telephoto end state (f=131.0 mm).

FIG. 13 is a diagram showing a lens configuration of a zoom lens system according to Example 7.

FIGS. 14A, 14B, and 14C are graphs showing various aberrations of the zoom lens system according to Example 7 focusing on infinity in which FIG. 14A shows various aberrations in a wide-angle end state (f=18.5 mm), FIG. 14B shows various aberrations in an intermediate focal length state (f=50.0 mm), and FIG. 14C shows various aberrations in a telephoto end state (f=131.0 mm).

DESCRIPTION OF THE MOST PREFERRED EMBODIMENTS

Figure 2A:
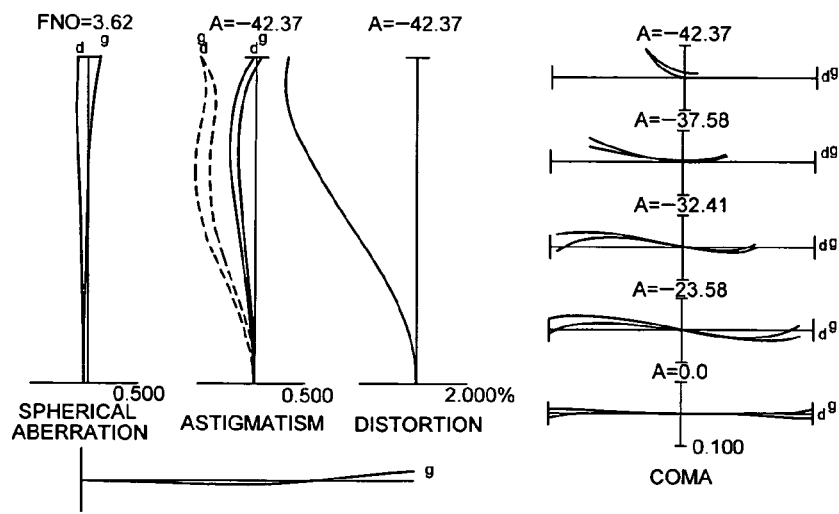

Embodiments according to the present invention are explained below in detail with reference to accompanying drawings.

A zoom lens system according to an embodiment is composed of, in order from an object, a first lens group having positive refractive power, a second lens group having negative refractive power, a third lens group having positive refractive power, a fourth lens group having negative refractive power, and a fifth lens group having positive refractive power. When a state of lens group positions varies from a wide-angle end state to a telephoto end state, a distance between the first lens group and the second lens group increases, a distance between the second lens group and the third lens group decreases, a distance between the third lens group and the fourth lens group increases, and a distance between the fourth lens group and the fifth lens group decreases. The following conditional expression (1) is satisfied:

$$-0.37 < f12W/X1 - < 0.20 \qquad (1)$$

where f12W denotes a combined focal length of the first lens group and the second lens group in the wide-angle end state focusing on infinity, and X1 denotes a moving amount of the first lens group upon zooming from the wide-angle end state to the telephoto end state. Here, the sign of the moving amount X1 is defined in the following manner. A position along the optical axis of the first lens group in the wide-angle end state is assumed to be an origin, and when a position of the first lens group in the telephoto end state is located to the object side of the origin, the sign of the moving amount X1 is defined to be positive.

In a high zoom ratio zoom lens system, the focal length is widely changed by significantly moving the first lens group upon varying from the wide-angle end state to the telephoto end state. In order to secure excellent optical performance over entire focal length range from the wide-angle end state to the telephoto end state, it is necessary to properly set refracting power of the first lens group and the second lens group.

Conditional expression (1) defines a ratio f12W/X1 of a combined focal length of the first lens group and the second lens group in the wide-angle end state upon focusing on infinity to a moving amount of the first lens group upon varying a state of lens group positions from the wide-angle end state to the telephoto end state.

When the ratio f12W/X1 is equal to or falls below the lower limit of conditional expression (1), combined refractive power of the first lens group and the second lens group in the wide-angle end state becomes weak. This means that refractive power of the first lens group becomes stronger than that of the second lens group. Accordingly, distortion in the telephoto end state becomes large, so that it becomes difficult to correct aberrations.

On the other hand, when the ratio f12W/X1 is equal to or exceeds the upper limit of conditional expression (1), combined refractive power of the first lens group and the second lens group in the wide-angle end state becomes strong. This means that refractive power of the second lens group becomes stronger than that of the first lens group. Accordingly, coma becomes large, so that it becomes difficult to correct aberrations. By satisfying conditional expression (1), it becomes easy to correct aberrations, so that excellent optical performance can be secured. In the present invention, when the lower limit of conditional expression (1) is set to −0.36, refractive power of the first lens group becomes weak and it becomes easy to correct aberrations, so that further satisfactory optical performance can be secured.

In the zoom lens system, in order to obtain excellent optical performance, it is preferable to satisfy the following conditional expression (2):

$$2.32 < X1/fW \quad (2)$$

where fW denotes a focal length of the zoom lens system in the wide-angle end state.

Conditional expression (2) defines a ratio X1/fW of a moving amount of the first lens group upon zooming from the wide-angle end state to the telephoto end state to a focal length of the zoom lens system in the wide-angle end state.

When the ratio X1/fW is equal to or falls below the lower limit of conditional expression (2), since the moving amount of the first lens group upon zooming from the wide-angle end state to the telephoto end state becomes small, it becomes impossible to accomplish a high zoom ratio, so that curvature of field cannot be sufficiently corrected over entire focal length range from the wide-angle end state to the telephoto end state. By satisfying conditional expression (2), it becomes easy to correct aberrations, so that excellent optical performance can be secured. In the present invention, when the lower limit of conditional expression (2) is set to 2.40, the moving amount of the first lens group upon zooming from the wide-angle end state to the telephoto end state becomes large, so that it becomes easy to correct curvature of field over entire focal length range from the wide-angle end state to the telephoto end state. Accordingly, further satisfactory optical performance can be secured.

In the zoom lens system, in order to secure excellent optical performance, it is preferable that the third lens group is composed of, in order from the object, a positive lens element, a positive lens element, and a negative lens element.

The third lens group mainly corrects spherical aberration. Since the third lens group has positive refractive power, by disposing a positive lens element to the object side and a negative lens element to the image side, it becomes easy to correct spherical aberration, and it becomes possible to secure excellent optical performance.

Each example of the zoom lens system will be explained below with reference to accompanying drawings.

In each example, an aspherical surface is exhibited by the following expression:

$$x = (y^2/r)/\{1 + (1 - \kappa y^2/r^2)^{1/2}\} + C4 \times y^4 + C6 \times y^6 + C8 \times y^8 + C10 \times y^{10}$$

where y denotes a height from the optical axis, x denotes a sag amount, r denotes a radius of curvature of a reference sphere (a paraxial radius of curvature), κ denotes a conical coefficient, and C4, C6, C8, and C10 denote aspherical coefficient of 4th order, 6th order, 8th order, and 10th order, respectively. The position of an aspherical surface is expressed by attaching "*" to the left side of the surface number in [Lens Data].

EXAMPLE 1

FIG. 1 is a diagram showing a lens configuration of a zoom lens system according to Example 1.

In FIG. 1, the zoom lens system according to Example 1 is composed of, in order from an object, a first lens group G1 having positive refractive power, a second lens group G2 having negative refractive power, a third lens group G3 having positive refractive power, a fourth lens group G4 having negative refractive power, and a fifth lens group G5 having positive refractive power. When a state of lens group positions varies from a wide-angle end state W to a telephoto end state T, a distance between the first lens group G1 and the second lens group G2 increases, a distance between the second lens group G2 and the third lens group G3 decreases, a distance between the third lens group G3 and the fourth lens group G4 increases, and a distance between the fourth lens group G4 and the fifth lens group G5 decreases.

The first lens group G1 is composed of a cemented lens L11 constructed by a negative meniscus lens having a convex surface facing the object cemented with a positive meniscus lens having a convex surface facing the object, and a positive meniscus lens L12 having a convex surface facing the object.

The second lens group G2 is composed of a negative meniscus lens L21 having a convex surface facing the object, a double concave negative lens L22, a double convex positive lens L23, and a negative meniscus lens L24 having a concave surface facing the object.

The third lens group G3 is composed of a double convex positive lens L31, and a cemented lens L32 constructed by a double convex positive lens cemented with a negative meniscus lens having a concave surface facing the object.

The fourth lens group G4 is composed of a cemented lens L41 constructed by a positive meniscus lens having a concave surface facing the object cemented with a double concave negative lens.

The fifth lens group G5 is composed of a double convex positive lens L51, a double convex positive lens L52, and a negative meniscus lens L53 having a concave surface facing the object.

An aperture stop S is disposed at a position 0.5 mm separated to the object side from the most object side lens surface of the third lens group G3 and moved in a body with the third lens group G3 upon zooming from the wide-angle end state W to the telephoto end state T.

The negative meniscus lens L21 in the second lens group G2 has a thin resin layer having an aspherical surface on the object side lens surface.

The third lens group G3 and the fifth lens group G5 are moved along the same moving trajectory upon zooming from the wide-angle end state W to the telephoto end state T.

Focusing from infinity to a close object is carried out by moving the second lens group G2 to the object side.

Various values of the zoom lens system according to Example 1 are listed in Table 1. In [Specifications], f denotes the focal length, FNO denotes the f-number, and 2ω denotes an angle of view (unit: degrees). In [Lens Data], the left most column shows the lens surface number counted in order from the object side, the second column "r" shows a radius of curvature of the lens surface, the third column "d" shows a distance to the next lens surface, the fourth column "n" shows refractive index of a medium at d-line (wavelength λ=587.6 nm), and the fifth column "ν" shows Abbe number of the medium at d-line (wavelength λ=587.6 nm). In [Lens Data], D denotes a variable distance, and BF denotes a back focal length. Refractive index of the air n=1.000000 is omitted. In [Aspherical Data], "κ" denotes a conical coefficient, and "Ci" denotes an i-th order aspherical coefficient. In [Variable Distances], f denotes the focal length. In [Values for Conditional Expressions], values for respective conditional expressions are shown.

In the tables for various values, "mm" is generally used for the unit of length such as the focal length, the radius of curvature and the distance to the next lens surface. However, since an optical system proportionally enlarged or reduced its dimension can be obtained similar optical performance, the unit is not necessary to be limited to "mm", and any other suitable unit can be used. The explanation of reference symbols is the same in the other examples, so that duplicated explanations are omitted.

TABLE 1

[Specifications]

|  | W | M | T |
|---|---|---|---|
| f = | 16.5 | 50.00 | 131.0 |
| FNO = | 3.6 | 5.1 | 5.9 |
| 2ω = | 87.2 | 32.2 | 12.6° |

[Lens Data]

| | r | d | n | ν |
|---|---|---|---|---|
| 1 | 126.5546 | 2.00 | 1.84666 | 23.8 |
| 2 | 66.7784 | 7.00 | 1.64000 | 60.1 |
| 3 | 1067.8052 | 0.10 | | |
| 4 | 60.0769 | 5.00 | 1.62041 | 60.3 |
| 5 | 207.1273 | (D5) | | |
| *6 | −4378.6441 | 0.05 | 1.55389 | 38.1 |
| 7 | 166.1760 | 1.20 | 1.80400 | 46.6 |
| 8 | 13.5653 | 5.40 | | |
| 9 | −33.1216 | 0.90 | 1.80400 | 46.6 |
| 10 | 45.4545 | 0.10 | | |
| 11 | 30.7925 | 4.50 | 1.80518 | 25.4 |
| 12 | −26.3806 | 0.36 | | |
| 13 | −21.6727 | 0.80 | 1.80400 | 46.6 |
| 14 | −75.6170 | (D14) | | |
| 15 | 71.3254 | 2.80 | 1.51680 | 64.1 |
| 16 | −42.6068 | 0.10 | | |
| 17 | 31.1567 | 3.20 | 1.51680 | 64.1 |
| 18 | −16.7666 | 0.80 | 1.80518 | 25.4 |
| 19 | −36.0879 | (D19) | | |
| 20 | −58.5031 | 2.60 | 1.84666 | 23.8 |
| 21 | −23.4581 | 0.80 | 1.80400 | 46.6 |
| 22 | 60.6686 | (D22) | | |
| 23 | 297.9151 | 4.30 | 1.58913 | 61.2 |
| 24 | −24.0171 | 0.10 | | |
| 25 | 61.4940 | 3.80 | 1.51680 | 64.1 |
| 26 | −44.8361 | 1.32 | | |
| 27 | −25.4443 | 1.10 | 1.80518 | 25.4 |
| 28 | −77.7656 | (BF) | | |

[Aspherical Data]
Surface Number 6

κ = 1.0000
C4 = 3.0584 × 10⁻⁵
C6 = −5.7658 × 10⁻⁸

TABLE 1-continued

C8 = −1.8724 × 10⁻¹⁰
C10 = 1.1512 × 10⁻¹²

[Variable Distances]

|  | W | M | T |
|---|---|---|---|
| f | 16.5 | 50.0 | 131.0 |
| D5 | 1.91 | 23.15 | 49.57 |
| D14 | 21.50 | 7.15 | 1.50 |
| D19 | 1.10 | 14.83 | 20.21 |
| D22 | 20.67 | 6.94 | 1.57 |

[Values for Conditional Expressions]

(1): f12W/X1 = −0.369
(2): X1/fW = 3.040

Figure 2B:
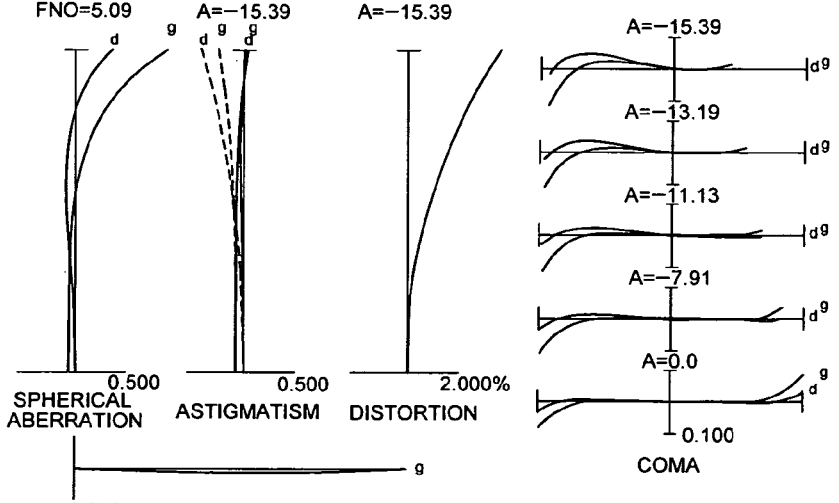
Figure 2C:
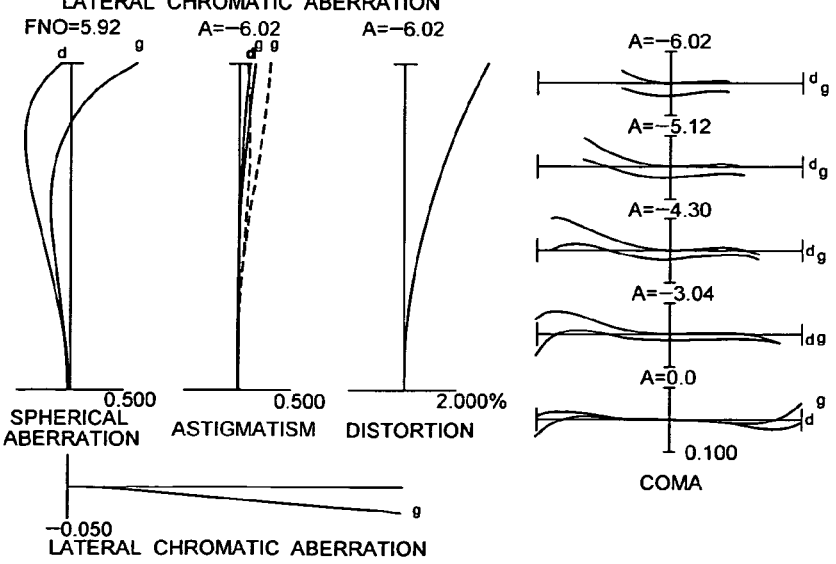

FIGS. 2A, 2B, and 2C are graphs showing various aberrations of the zoom lens system according to Example 1 focusing on infinity in which FIG. 2A shows various aberrations in a wide-angle end state (f=16.5 mm), FIG. 2B shows various aberrations in an intermediate focal length state (f=50.0 mm), and FIG. 2C shows various aberrations in a telephoto end state (f=131.0 mm). In respective graphs, d denotes aberration curve at d-line (wavelength λ=587.6 nm), and g denotes aberration curve at g-line (wavelength λ=435.8 nm), FNO denotes an f-number, and A denotes a half angle of view (unit: degrees). In the graphs showing spherical aberration, the f-number with respect to the maximum aperture is shown. In graphs showing astigmatism and distortion, the maximum value of a half angle of view A is shown. In graphs showing coma, coma with respect to each half angle of view A is shown. In the graph showing astigmatism, a solid line indicates a sagittal image plane, and a broken line indicates a meridional image plane. The above-described explanation regarding various aberration graphs is the same as the other examples.

As is apparent from the respective graphs, the zoom lens system according to Example 1 shows superb optical performance as a result of good corrections to various aberrations in each focal length state.

EXAMPLE 2

Figure 3:
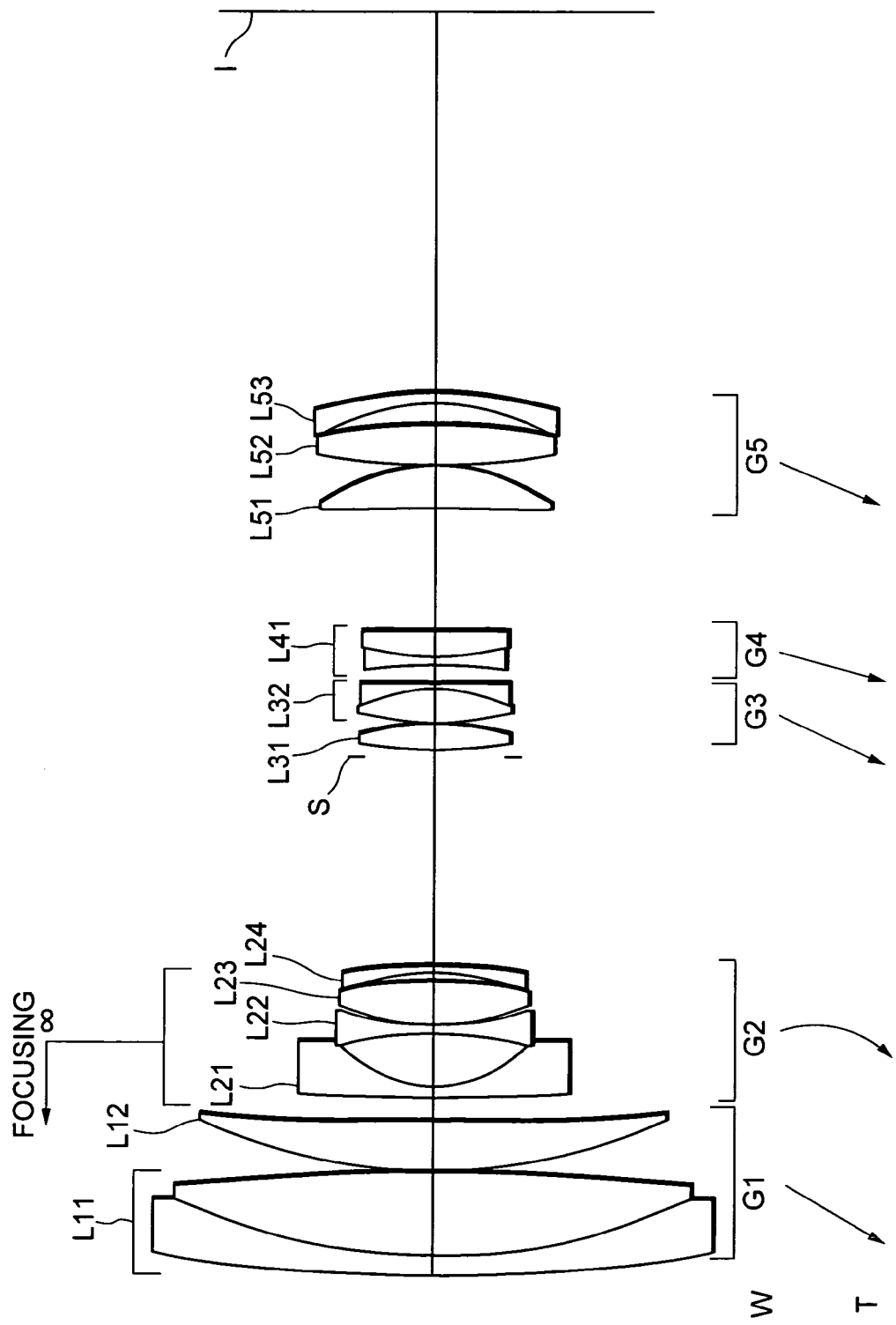
FIG. 3 is a diagram showing a lens configuration of a zoom lens system according to Example 2.

FIG. 3 is a diagram showing a lens configuration of a zoom lens system according to Example 2.

In FIG. 3, the zoom lens system according to Example 2 is composed of, in order from an object, a first lens group G1 having positive refractive power, a second lens group G2 having negative refractive power, a third lens group G3 having positive refractive power, a fourth lens group G4 having negative refractive power, and a fifth lens group G5 having positive refractive power. When a state of lens group positions varies from a wide-angle end state W to a telephoto end state T, a distance between the first lens group G1 and the second lens group G2 increases, a distance between the second lens group G2 and the third lens group G3 decreases, a distance between the third lens group G3 and the fourth lens group G4 increases, and a distance between the fourth lens group G4 and the fifth lens group G5 decreases.

The first lens group G1 is composed of a cemented lens L11 constructed by a negative meniscus lens having a convex surface facing the object cemented with a double convex positive lens, and a positive meniscus lens L12 having a convex surface facing the object.

The second lens group G2 is composed of a negative meniscus lens L21 having a convex surface facing the object, a double concave negative lens L22, a double convex positive lens L23, and a negative meniscus lens L24 having a concave surface facing the object.

The third lens group G3 is composed of a double convex positive lens L31, and a cemented lens L32 constructed by a double convex positive lens cemented with a double concave negative lens.

The fourth lens group G4 is composed of a cemented lens L41 constructed by a double concave negative lens cemented with a positive meniscus lens having a convex surface facing the object.

The fifth lens group G5 is composed of a positive meniscus lens L51 having a concave surface facing the object, a double convex positive lens L52, and a negative meniscus lens L53 having a concave surface facing the object.

An aperture stop S is disposed at a position 0.5 mm separated to the object side from the most object side lens surface of the third lens group G3 and moved in a body with the third lens group G3 upon zooming from the wide-angle end state W to the telephoto end state T.

The negative meniscus lens L21 in the second lens group G2 has a thin resin layer having an aspherical surface on the object side lens surface.

The third lens group G3 and the fifth lens group G5 are moved along the same moving trajectory upon zooming from the wide-angle end state W to the telephoto end state T.

Focusing from infinity to a close object is carried out by moving the second lens group G2 to the object side.

Various values of the zoom lens system according to Example 2 are listed in Table 2.

TABLE 2

[Specifications]

| | W | M | T |
|---|---|---|---|
| f = | 18.5 | 50.00 | 131.0 |
| FNO = | 3.4 | 4.7 | 5.9 |
| 2ω = | 80.7 | 32.2 | 12.7° |

[Lens Data]

| | r | d | n | ν |
|---|---|---|---|---|
| 1 | 145.7445 | 1.80 | 1.79504 | 28.7 |
| 2 | 54.8901 | 8.50 | 1.51680 | 64.1 |
| 3 | −351.9146 | 0.10 | | |
| 4 | 51.1752 | 5.00 | 1.62041 | 60.3 |
| 5 | 265.7581 | (D5) | | |
| *6 | 465.5981 | 0.05 | 1.55389 | 38.1 |
| 7 | 202.4604 | 1.20 | 1.77250 | 49.6 |
| 8 | 13.0304 | 5.16 | | |
| 9 | −44.9502 | 0.90 | 1.77250 | 49.6 |
| 10 | 28.6849 | 0.10 | | |
| 11 | 23.2925 | 4.30 | 1.80518 | 25.4 |
| 12 | −48.8852 | 0.82 | | |
| 13 | −24.6443 | 0.80 | 1.77250 | 49.6 |
| 14 | −58.9080 | (D14) | | |
| 15 | 30.7480 | 2.80 | 1.49700 | 81.6 |
| 16 | −28.0738 | 0.10 | | |
| 17 | 25.3540 | 3.20 | 1.51680 | 64.1 |
| 18 | −20.5151 | 0.80 | 1.80440 | 39.6 |
| 19 | 178.1239 | (D19) | | |
| 20 | −41.2566 | 0.80 | 1.77250 | 49.6 |
| 21 | 25.9668 | 2.60 | 1.71736 | 29.5 |
| 22 | 240.8079 | (D22) | | |
| 23 | −537.9133 | 4.40 | 1.49700 | 81.6 |
| 24 | −19.7323 | 0.10 | | |
| 25 | 57.5672 | 4.00 | 1.62041 | 60.3 |
| 26 | −70.8073 | 2.22 | | |
| 27 | −21.8481 | 1.10 | 1.80518 | 25.4 |
| 28 | −44.0583 | (BF) | | |

[Aspherical Data]
Surface Number 6

$\kappa = 1.0000$
$C4 = 1.7957 \times 10^{-5}$
$C6 = -5.4872 \times 10^{-8}$
$C8 = 4.0497 \times 10^{-11}$
$C10 = 1.5604 \times 10^{-13}$

[Variable Distances]

| | W | M | T |
|---|---|---|---|
| f | 18.5 | 50.0 | 131.0 |
| D5 | 2.33 | 22.88 | 43.72 |
| D14 | 21.84 | 9.49 | 2.50 |
| D19 | 2.00 | 9.32 | 13.16 |
| D22 | 12.61 | 5.29 | 1.44 |

[Values for Conditional Expressions]

(1): f12W/X1 = −0.369
(2): X1/fW = 2.777

Figure 4A:
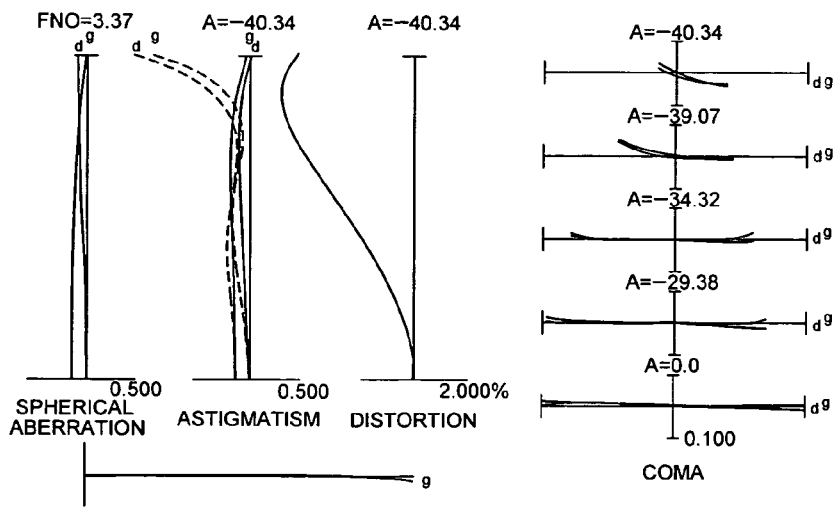
Figure 4B:
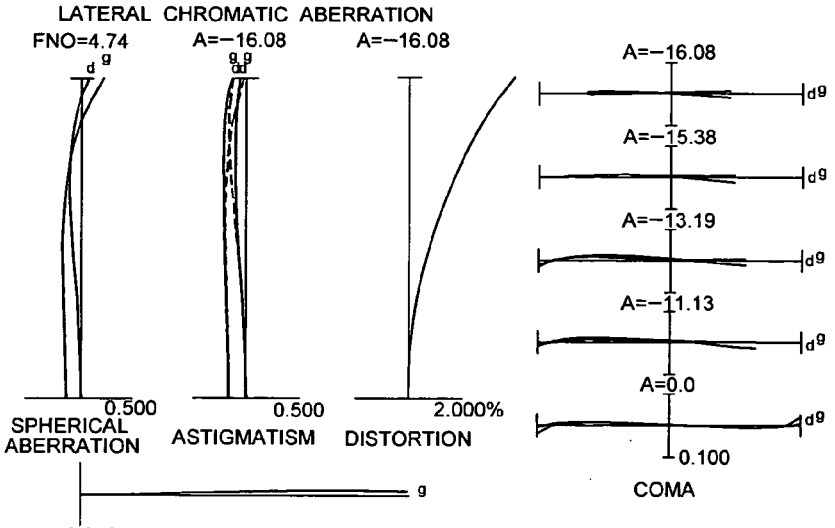
Figure 4C:
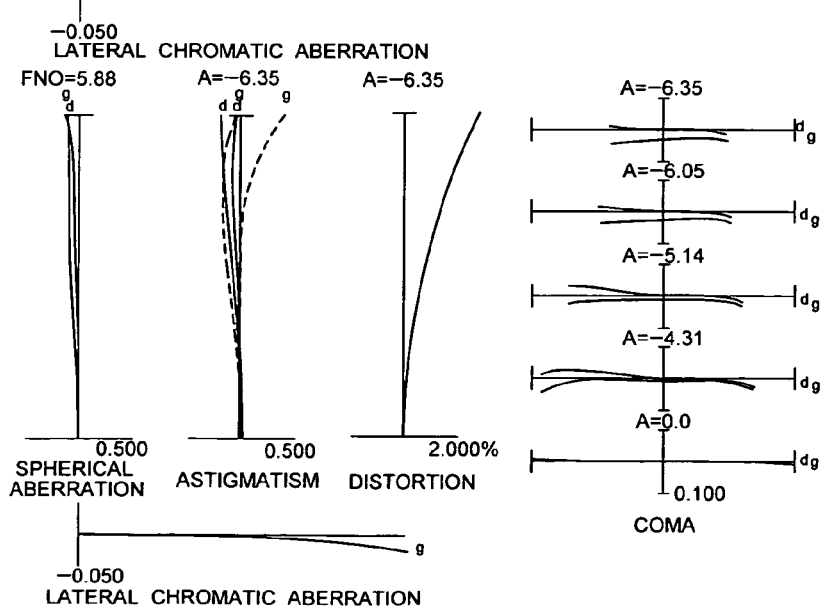

FIGS. 4A, 4B and 4C are graphs showing various aberrations of the zoom lens system according to Example 2 focusing on infinity in which FIG. 4A shows various aberrations in a wide-angle end state (f=18.5 mm), FIG. 4B shows various aberrations in an intermediate focal length state (f=50.0 mm), and FIG. 4C shows various aberrations in a telephoto end state (f=131.0 mm).

As is apparent from the respective graphs, the zoom lens system according to Example 2 shows superb optical performance as a result of good corrections to various aberrations in each focal length state.

EXAMPLE 3

Figure 5:
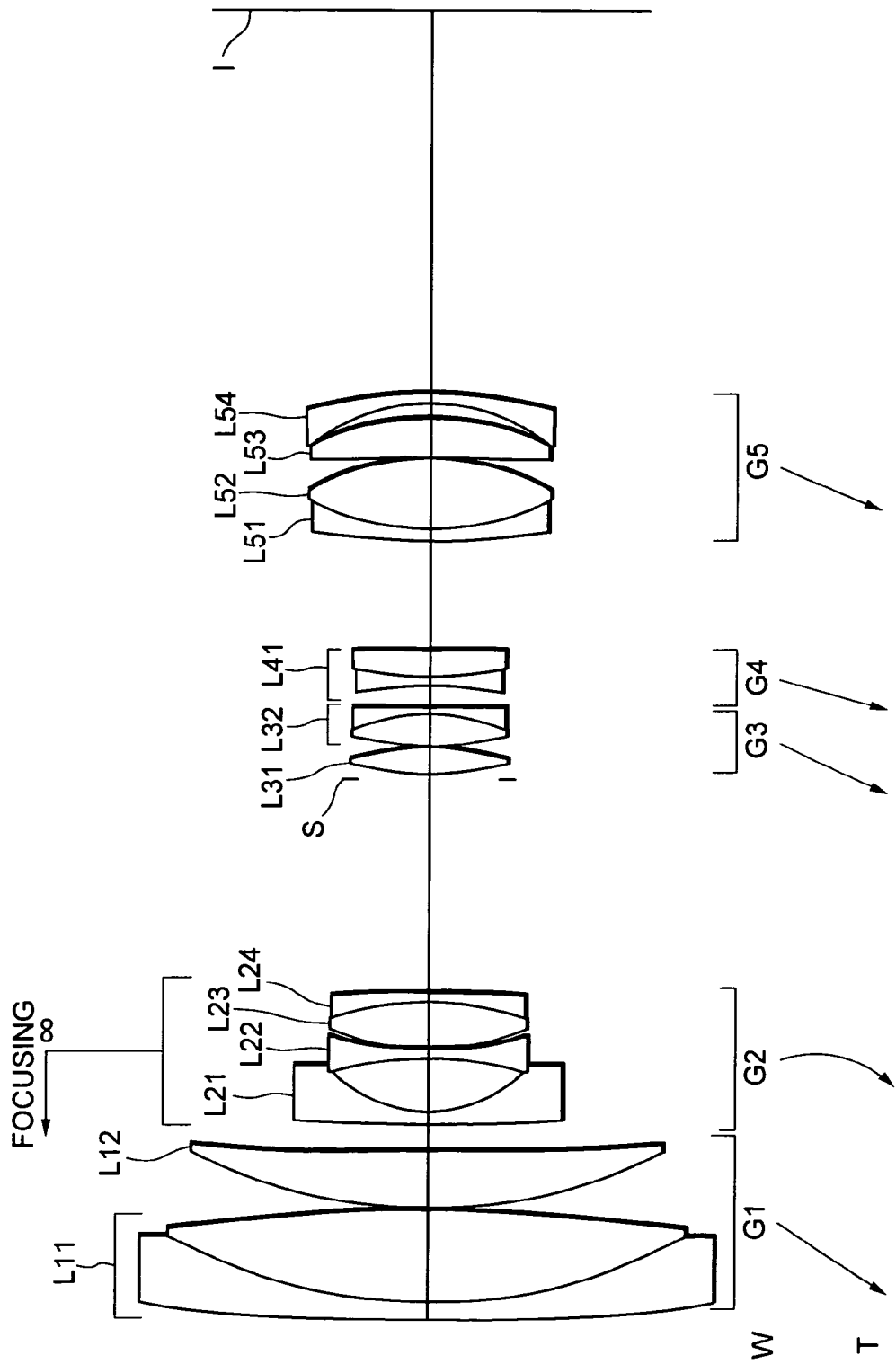
FIG. 5 is a diagram showing a lens configuration of a zoom lens system according to Example 3.

FIG. 5 is a diagram showing a lens configuration of a zoom lens system according to Example 3.

In FIG. 5, the zoom lens system according to Example 3 is composed of, in order from an object, a first lens group G1 having positive refractive power, a second lens group G2 having negative refractive power, a third lens group G3 having positive refractive power, a fourth lens group G4 having negative refractive power, and a fifth lens group G5 having positive refractive power. When a state of lens group positions varies from a wide-angle end state W to a telephoto end state T, a distance between the first lens group G1 and the second lens group G2 increases, a distance between the second lens group G2 and the third lens group G3 decreases, a distance between the third lens group G3 and the fourth lens group G4 increases, and a distance between the fourth lens group G4 and the fifth lens group G5 decreases.

The first lens group G1 is composed of a cemented lens L11 constructed by a negative meniscus lens having a convex surface facing the object cemented with a double convex positive lens, and a positive meniscus lens L12 having a convex surface facing the object.

The second lens group G2 is composed of a negative meniscus lens L21 having a convex surface facing the object, a double concave negative lens L22, a double convex positive lens L23, and a negative meniscus lens L24 having a concave surface facing the object.

The third lens group G3 is composed of a double convex positive lens L31, and a cemented lens L32 constructed by a double convex positive lens cemented with a double concave negative lens.

The fourth lens group G4 is composed of a double concave negative lens L41, and a positive meniscus lens L42 having a convex surface facing the object.

The fifth lens group G5 is composed of a negative meniscus lens L51 having a convex surface facing the object, a double convex positive lens L52, a positive meniscus lens L53 having a concave surface facing the object, and a negative meniscus lens L54 having a concave surface facing the object.

An aperture stop S is disposed at a position 0.5 mm separated to the object side from the most object side lens surface of the third lens group G3 and moved in a body with the third lens group G3 upon zooming from the wide-angle end state W to the telephoto end state T.

The negative meniscus lens L21 in the second lens group G2 has a thin resin layer having an aspherical surface on the object side lens surface. The negative meniscus lens L51 in the fifth lens group G5 has a thin resin layer having an aspherical surface on the object side lens surface.

The third lens group G3 and the fifth lens group G5 are moved along the same moving trajectory upon zooming from the wide-angle end state W to the telephoto end state T.

Focusing from infinity to a close object is carried out by moving the second lens group G2 to the object side.

Various values of the zoom lens system according to Example 3 are listed in Table 3.

TABLE 3

[Specifications]

|   | W | M | T |
|---|---|---|---|
| f = | 18.5 | 50.0 | 131.0 |
| FNO = | 3.5 | 4.8 | 5.9 |
| 2ω = | 80.9 | 32.4 | 12.8° |

[Lens Data]

|  | r | d | n | ν |
|---|---|---|---|---|
| 1 | 193.9082 | 1.80 | 1.80100 | 35.0 |
| 2 | 49.6870 | 9.00 | 1.48749 | 70.4 |
| 3 | −224.7910 | 0.10 | | |
| 4 | 46.9560 | 6.00 | 1.62041 | 60.3 |
| 5 | 316.9778 | (D5) | | |
| *6 | 216.4231 | 0.05 | 1.55389 | 38.1 |
| 7 | 206.1173 | 1.20 | 1.77250 | 49.6 |
| 8 | 12.4404 | 5.34 | | |
| 9 | −37.9219 | 0.90 | 1.77250 | 49.6 |
| 10 | 35.3821 | 0.10 | | |
| 11 | 23.8316 | 4.60 | 1.75520 | 27.5 |
| 12 | −28.0304 | 0.10 | | |
| 13 | −27.3391 | 0.80 | 1.77250 | 49.6 |
| 14 | −617.9568 | (D14) | | |
| 15 | 27.3384 | 2.80 | 1.48749 | 70.4 |
| 16 | −23.5648 | 0.10 | | |
| 17 | 27.0170 | 3.20 | 1.49700 | 81.6 |
| 18 | −18.0824 | 0.80 | 1.80440 | 39.6 |
| 19 | 271.5230 | (D19) | | |
| 20 | −31.5712 | 0.80 | 1.77250 | 49.6 |
| 21 | 28.1470 | 0.05 | | |
| 22 | 27.0514 | 2.60 | 1.75520 | 27.5 |
| 23 | 330.4626 | (D23) | | |
| *24 | 73.4933 | 0.05 | 1.55389 | 38.1 |
| 25 | 72.6785 | 1.10 | 1.77250 | 49.6 |
| 26 | 24.2461 | 0.10 | | |
| 27 | 24.6955 | 7.00 | 1.69680 | 55.5 |
| 28 | −24.4542 | 0.10 | | |

TABLE 3-continued

| 29 | −388.8859 | 4.00 | 1.51680 | 64.1 |
|---|---|---|---|---|
| 30 | −28.7410 | 1.45 | | |
| 31 | −17.9015 | 1.10 | 1.75520 | 27.5 |
| 32 | −47.2127 | (BF) | | |

[Aspherical Data]

Surface Number 6

κ = 1.0000
C4 = 1.0123 × 10$^{-5}$
C6 = −7.1285 × 10$^{-8}$
C8 = 1.9714 × 10$^{-10}$
C10 = −2.5487 × 10$^{-13}$

Surface Number 24

κ = 1.0000
C4 = 1.5333 × 10$^{-6}$
C6 = −2.0310 × 10$^{-9}$
C8 = 4.2995 × 10$^{-10}$
C10 = −1.0927 × 10$^{-12}$

[Variable Distances]

|  | W | M | T |
|---|---|---|---|
| f | 18.5 | 50.0 | 131.0 |
| D5 | 2.60 | 24.07 | 45.72 |
| D14 | 22.30 | 10.00 | 2.95 |
| D19 | 2.19 | 8.89 | 12.06 |
| D23 | 11.27 | 4.58 | 1.40 |

[Values for Conditional Expressions]

(1): f12W/X1 = −0.352
(2): X1/fW = 2.859

Figure 6A:
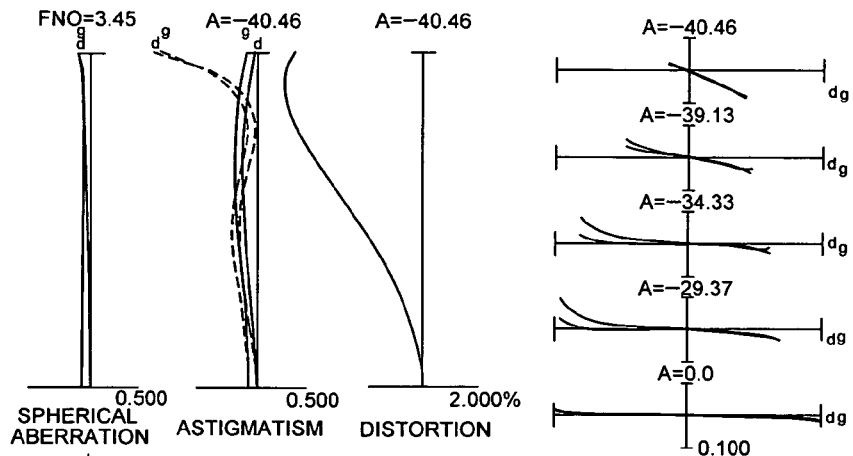
Figure 6B:
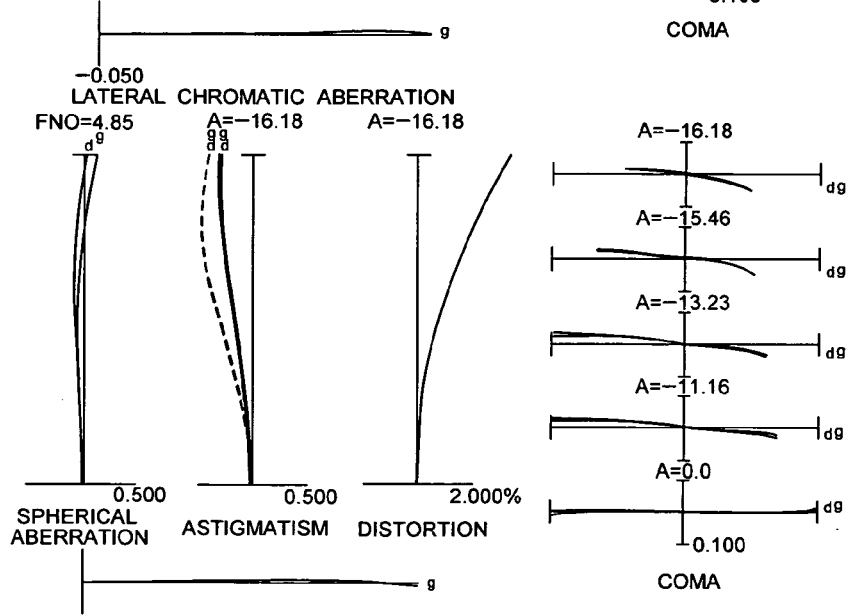
Figure 6C:
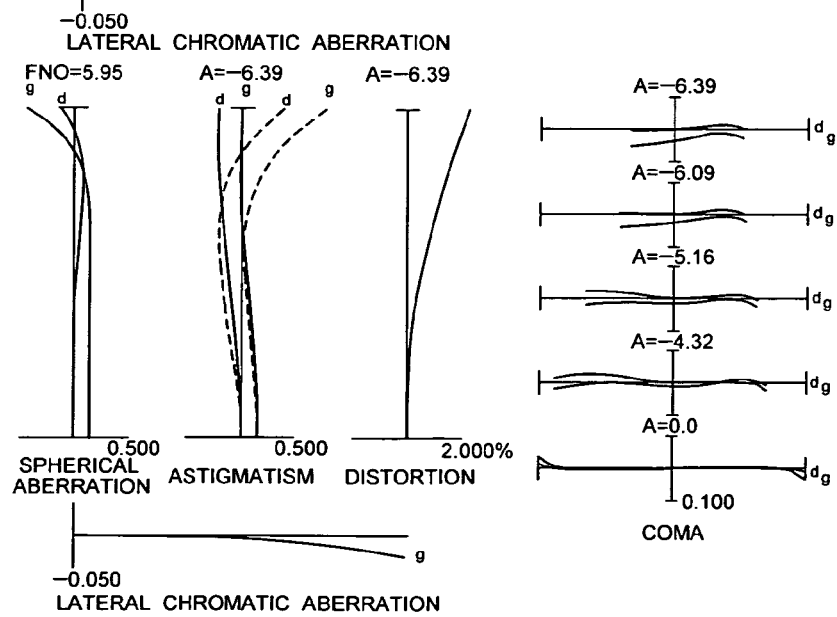

FIGS. 6A, 6B and 6C are graphs showing various aberrations of the zoom lens system according to Example 3 focusing on infinity in which FIG. 6A shows various aberrations in a wide-angle end state (f=18.5 mm), FIG. 6B shows various aberrations in an intermediate focal length state (f=50.0 mm), and FIG. 6C shows various aberrations in a telephoto end state (f=131.0 mm).

As is apparent from the respective graphs, the zoom lens system according to Example 3 shows superb optical performance as a result of good corrections to various aberrations in each focal length state.

EXAMPLE 4

FIG. 7 is a diagram showing a lens configuration of a zoom lens system according to Example 4.

In FIG. 7, the zoom lens system according to Example 4 is composed of, in order from an object, a first lens group G1 having positive refractive power, a second lens group G2 having negative refractive power, a third lens group G3 having positive refractive power, a fourth lens group G4 having negative refractive power, and a fifth lens group G5 having positive refractive power. When a state of lens group positions varies from a wide-angle end state W to a telephoto end state T, a distance between the first lens group G1 and the second lens group G2 increases, a distance between the second lens group G2 and the third lens group G3 decreases, a distance between the third lens group G3 and the fourth lens group G4 increases, and a distance between the fourth lens group G4 and the fifth lens group G5 decreases.

The first lens group G1 is composed of a cemented lens L11 constructed by a negative meniscus lens having a convex surface facing the object cemented with a double convex positive lens, and a positive meniscus lens L12 having a convex surface facing the object.

The second lens group G2 is composed of a negative meniscus lens L21 having a convex surface facing the object, a double concave negative lens L22, a double convex positive lens L23, and a negative meniscus lens L24 having a concave surface facing the object.

The third lens group G3 is composed of a double convex positive lens L31, and a cemented lens L32 constructed by a double convex positive lens cemented with a negative meniscus lens having a concave surface facing the object.

The fourth lens group G4 is composed of a cemented lens L41 constructed by a double concave negative lens cemented with a positive meniscus lens having a convex surface facing the object.

The fifth lens group G5 is composed of a double convex positive lens L51, a cemented lens L52 constructed by a double convex positive lens cemented with a negative meniscus lens having a concave surface facing the object, and a negative meniscus lens L53 having a concave surface facing the object.

An aperture stop S is disposed at a position 0.5 mm separated to the object side from the most object side lens surface of the third lens group G3 and moved in a body with the third lens group G3 upon zooming from the wide-angle end state W to the telephoto end state T.

The negative meniscus lens L21 in the second lens group G2 has a thin resin layer having an aspherical surface on the object side lens surface. The cemented lens L52 in the fifth lens group G5 has a thin resin layer having an aspherical surface on the image plane I side lens surface.

The third lens group G3 and the fifth lens group G5 are moved along the same moving trajectory upon zooming from the wide-angle end state W to the telephoto end state T.

Focusing from infinity to a close object is carried out by moving the second lens group G2 to the object side.

Various values of the zoom lens system according to Example 4 are listed in Table 4.

TABLE 4

[Specifications]

|   | W | M | T |
|---|---|---|---|
| f = | 18.5 | 50.0 | 131.0 |
| FNO = | 3.6 | 5.0 | 5.9 |
| 2ω = | 80.8 | 32.1 | 12.7° |

[Lens Data]

|   | r | d | n | ν |
|---|---|---|---|---|
| 1 | 165.4240 | 2.00 | 1.83400 | 37.2 |
| 2 | 48.8442 | 9.00 | 1.49782 | 82.6 |
| 3 | −1123.3428 | 0.10 | | |
| 4 | 52.8883 | 6.30 | 1.69680 | 55.5 |
| 5 | 565.8602 | (D5) | | |
| *6 | 131.9698 | 0.15 | 1.55389 | 38.1 |
| 7 | 87.9798 | 1.20 | 1.80400 | 46.6 |
| 8 | 13.1453 | 5.98 | | |
| 9 | −36.5788 | 1.00 | 1.80400 | 46.6 |
| 10 | 42.0417 | 0.10 | | |
| 11 | 29.0952 | 4.80 | 1.84666 | 23.8 |
| 12 | −37.4707 | 1.05 | | |
| 13 | −21.5887 | 1.00 | 1.78800 | 47.4 |
| 14 | −63.6197 | (D14) | | |
| 15 | 50.6723 | 3.00 | 1.62041 | 60.3 |
| 16 | −31.8329 | 0.10 | | |
| 17 | 26.8756 | 3.60 | 1.48749 | 70.5 |
| 18 | −28.9435 | 1.00 | 1.84666 | 23.8 |

TABLE 4-continued

| 19 | −1168.8001 | (D19) | | |
|---|---|---|---|---|
| 20 | −30.7314 | 1.00 | 1.78800 | 47.4 |
| 21 | 21.6618 | 2.20 | 1.80518 | 25.4 |
| 22 | 226.2542 | (D22) | | |
| 23 | 103.7168 | 5.00 | 1.49782 | 82.6 |
| 24 | −21.6146 | 0.10 | | |
| 25 | 50.7363 | 5.30 | 1.49782 | 82.6 |
| 26 | −22.7721 | 0.80 | 1.77250 | 49.6 |
| 27 | −39.4137 | 0.05 | 1.55389 | 38.1 |
| *28 | −37.5331 | 1.00 | | |
| 29 | −42.2349 | 1.40 | 1.80100 | 35.0 |
| 30 | −1000.0000 | (BF) | | |

[Aspherical Data]

Surface Number 6

κ = 1.0000
C4 = 1.8486 × $10^{-5}$
C6 = −5.9770 × $10^{-8}$
C8 = 1.6277 × $10^{-10}$
C10 = −1.7269 × $10^{-13}$

Surface Number 28

κ = 1.0000
C4 = 1.5159 × $10^{-5}$
C6 = 2.6157 × $10^{-8}$
C8 = −1.2200 × $10^{-10}$
C10 = 4.4211 × $10^{-13}$

[Variable Distances]

|   | W | M | T |
|---|---|---|---|
| f | 18.5 | 50.0 | 131.0 |
| D5 | 2.10 | 27.30 | 48.28 |
| D14 | 20.57 | 9.50 | 2.50 |
| D19 | 2.80 | 8.82 | 11.84 |
| D22 | 10.04 | 4.01 | 1.00 |

[Values for Conditional Expressions]

(1): f12W/X1 = −0.305
(2): X1/fW = 3.236

Figure 8A:
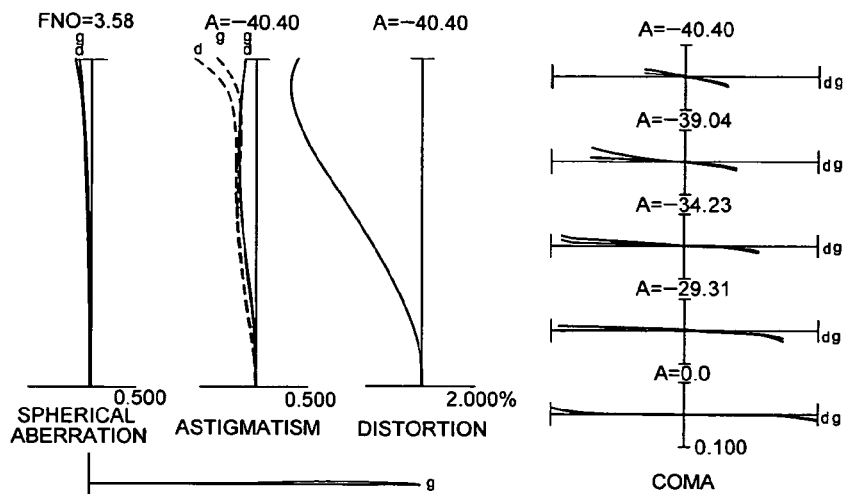
Figure 8B:
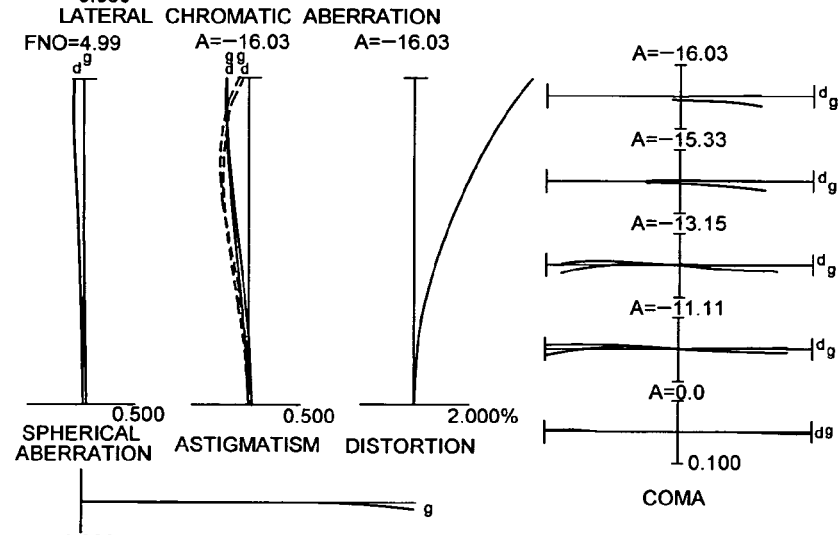
Figure 8C:
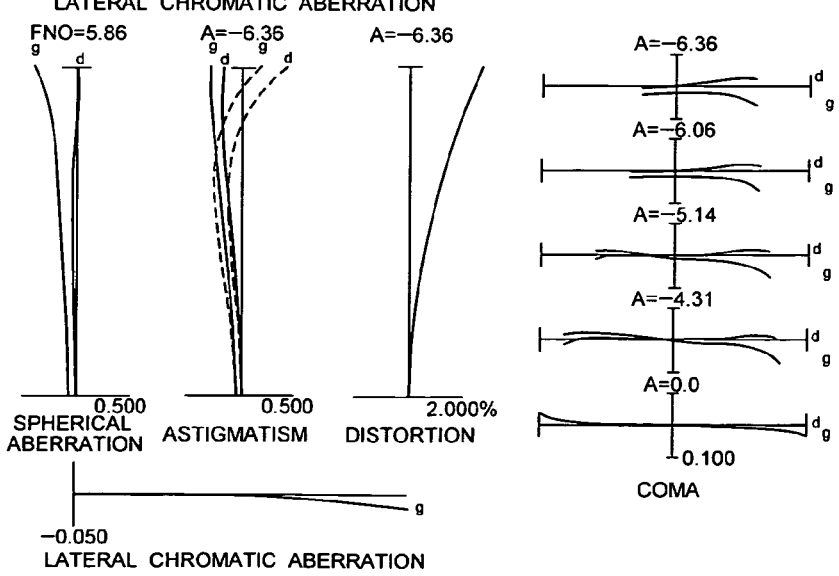

FIGS. 8A, 8B and 8C are graphs showing various aberrations of the zoom lens system according to Example 4 focusing on infinity in which FIG. 8A shows various aberrations in a wide-angle end state (f=18.5 mm), FIG. 8B shows various aberrations in an intermediate focal length state (f=50.0 mm), and FIG. 8C shows various aberrations in a telephoto end state (f=131.0 mm).

As is apparent from the respective graphs, the zoom lens system according to Example 4 shows superb optical performance as a result of good corrections to various aberrations in each focal length state.

EXAMPLE 5

Figure 9:
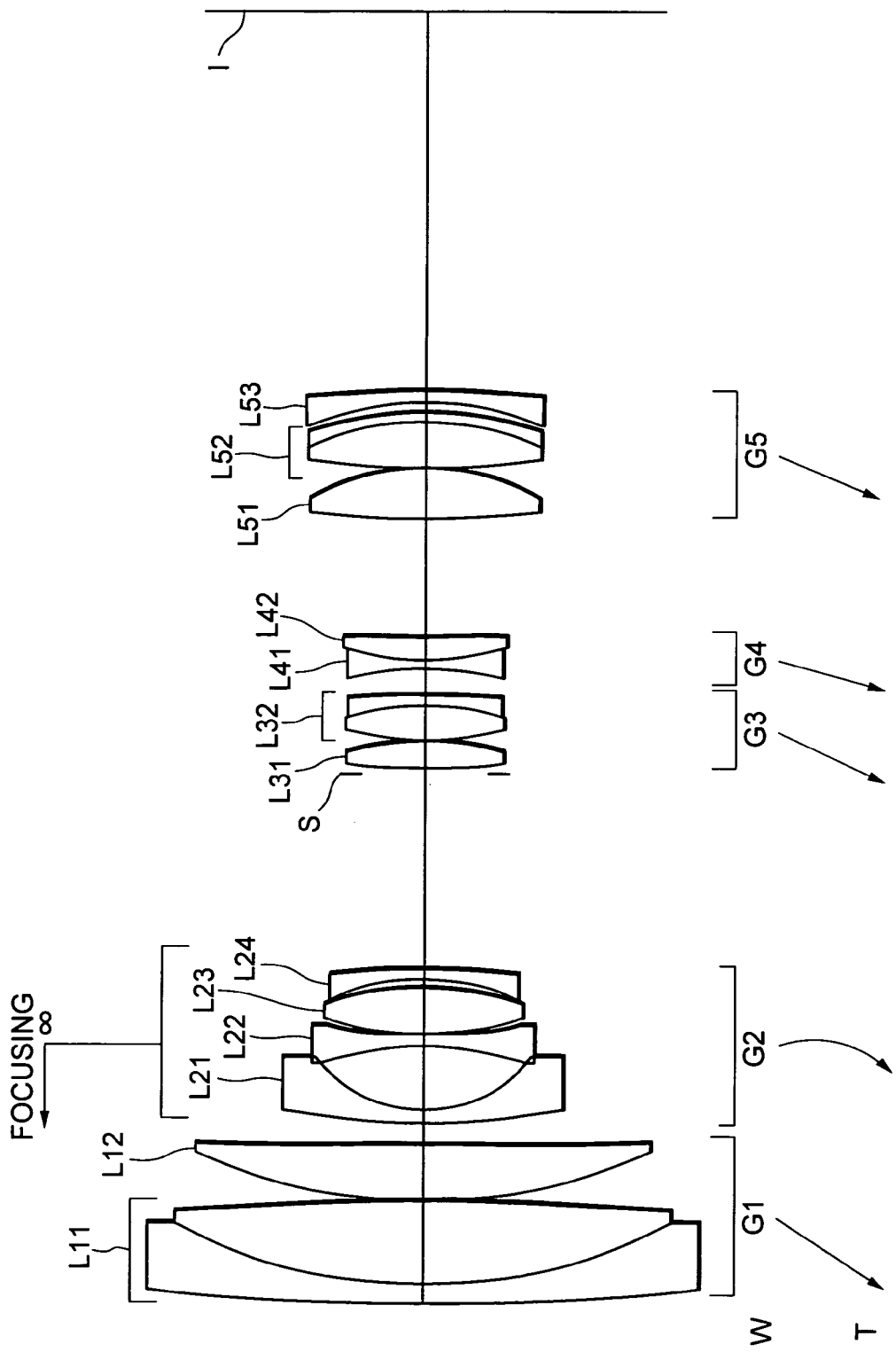
FIG. 9 is a diagram showing a lens configuration of a zoom lens system according to Example 5.

FIG. 9 is a diagram showing a lens configuration of a zoom lens system according to Example 5.

In FIG. 9, the zoom lens system according to Example 5 is composed of, in order from an object, a first lens group G1 having positive refractive power, a second lens group G2 having negative refractive power, a third lens group G3 having positive refractive power, a fourth lens group G4 having negative refractive power, and a fifth lens group G5 having positive refractive power. When a state of lens group positions varies from a wide-angle end state W to a telephoto end state T, a distance between the first lens group G1 and the second lens group G2 increases, a distance between the second lens group G2 and the third lens group G3 decreases, a distance between the third lens group G3 and the fourth lens group G4 increases, and a distance between the fourth lens group G4 and the fifth lens group G5 decreases.

The first lens group G1 is composed of a cemented lens L11 constructed by a negative meniscus lens having a convex surface facing the object cemented with a double convex positive lens, and a positive meniscus lens L12 having a convex surface facing the object.

The second lens group G2 is composed of a negative meniscus lens L21 having a convex surface facing the object, a double concave negative lens L22, a double convex positive lens L23, and a negative meniscus lens L24 having a concave surface facing the object.

The third lens group G3 is composed of a double convex positive lens L31, and a cemented lens L32 constructed by a double convex positive lens cemented with a negative meniscus lens having a concave surface facing the object.

The fourth lens group G4 is composed of a double concave negative lens L41, and a positive meniscus lens L42 having a convex surface facing the object.

The fifth lens group G5 is composed of a double convex positive lens L51, a cemented lens L52 constructed by a double convex positive lens cemented with a negative meniscus lens having a concave surface facing the object, and a negative meniscus lens L53 having a concave surface facing the object.

An aperture stop S is disposed at a position 0.5 mm separated to the object side from the most object side lens surface of the third lens group G3 and moved in a body with the third lens group G3 upon zooming from the wide-angle end state W to the telephoto end state T.

The negative meniscus lens L21 in the second lens group G2 has a thin resin layer having an aspherical surface on the object side lens surface. The cemented lens L52 in the fifth lens group G5 has a thin resin layer having an aspherical surface on the image plane I side lens surface.

The third lens group G3 and the fifth lens group G5 are moved along the same moving trajectory upon zooming from the wide-angle end state W to the telephoto end state T.

Focusing from infinity to a close object is carried out by moving the second lens group G2 to the object side.

Various values of the zoom lens system according to Example 5 are listed in Table 5.

TABLE 5

[Specifications]

|  | W | M | T |
|---|---|---|---|
| f = | 18.5 | 50.0 | 131.0 |
| FNO = | 3.6 | 4.9 | 5.9 |
| 2ω = | 80.7 | 32.1 | 12.7° |

[Lens Data]

| | r | d | n | ν |
|---|---|---|---|---|
| 1 | 212.4279 | 2.00 | 1.80100 | 35.0 |
| 2 | 52.1789 | 8.30 | 1.48749 | 70.5 |
| 3 | −424.8582 | 0.10 | | |
| 4 | 55.4289 | 5.50 | 1.69680 | 55.5 |
| 5 | 563.3093 | (D5) | | |
| *6 | 94.6395 | 0.15 | 1.55389 | 38.1 |
| 7 | 74.8101 | 1.20 | 1.77250 | 49.6 |
| 8 | 13.6287 | 6.50 | | |
| 9 | −36.1189 | 1.00 | 1.79952 | 42.2 |
| 10 | 42.8459 | 0.10 | | |
| 11 | 28.7346 | 4.80 | 1.84666 | 23.8 |
| 12 | −32.5961 | 0.80 | | |

TABLE 5-continued

| 13 | −22.0137 | 1.00 | 1.78590 | 44.2 |
|---|---|---|---|---|
| 14 | −176.4859 | (D14) | | |
| 15 | 72.9747 | 2.70 | 1.62041 | 60.3 |
| 16 | −29.6905 | 0.10 | | |
| 17 | 24.7190 | 3.60 | 1.48749 | 70.5 |
| 18 | −30.6554 | 1.00 | 1.84666 | 23.8 |
| 19 | −1410.7071 | (D19) | | |
| 20 | −33.1023 | 1.00 | 1.77250 | 49.6 |
| 21 | 24.9298 | 0.07 | | |
| 22 | 25.2016 | 2.30 | 1.80518 | 25.4 |
| 23 | 175.5103 | (D23) | | |
| 24 | 74.5356 | 5.10 | 1.49782 | 82.6 |
| 25 | −22.6485 | 0.10 | | |
| 26 | 74.8572 | 4.60 | 1.49782 | 82.6 |
| 27 | −28.0702 | 1.00 | 1.77250 | 49.6 |
| 28 | −34.9408 | 0.05 | 1.55389 | 38.1 |
| *29 | −33.2769 | 1.00 | | |
| 30 | −28.9921 | 1.20 | 1.80100 | 35.0 |
| 31 | −120.4819 | (BF) | | |

[Aspherical Data]

Surface Number 6

κ = 1.0000
C4 = 1.1510 × $10^{-5}$
C6 = −2.4512 × $10^{-8}$
C8 = 2.7675 × $10^{-11}$
C10 = 1.3077 × $10^{-13}$

Surface Number 29

κ = 1.0000
C4 = 1.2549 × $10^{-5}$
C6 = 3.1756 × $10^{-8}$
C8 = −1.5401 × $10^{-10}$
C10 = 6.7304 × $10^{-13}$

[Variable Distances]

| | W | M | T |
|---|---|---|---|
| f | 18.5 | 50.0 | 131.0 |
| D5 | 2.10 | 25.60 | 49.66 |
| D14 | 20.59 | 8.89 | 2.50 |
| D19 | 2.71 | 10.13 | 13.80 |
| D23 | 12.09 | 4.67 | 1.00 |

[Values for Conditional Expressions]

(1): f12W/X1 = −0.312
(2): X1/fW = 3.212

Figure 10A:
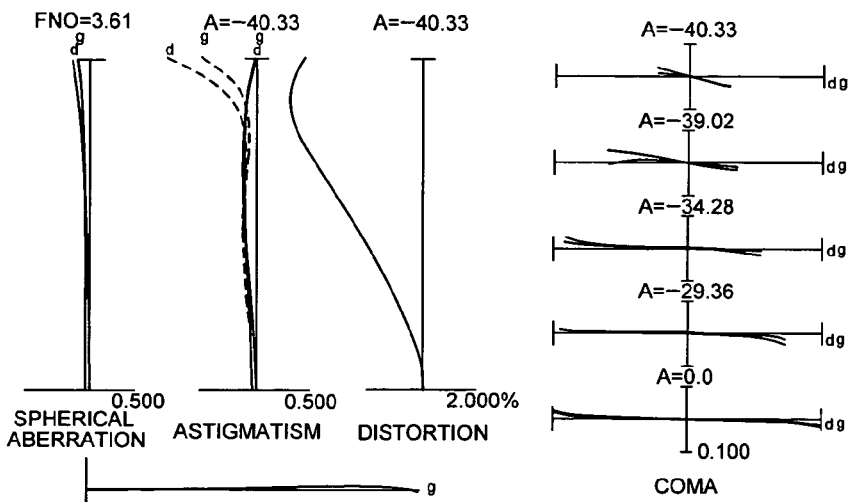
Figure 10B:
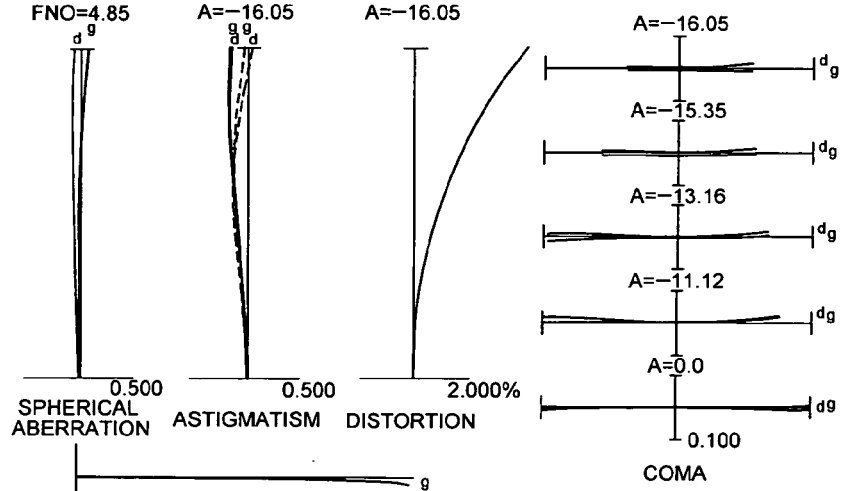
Figure 10C:
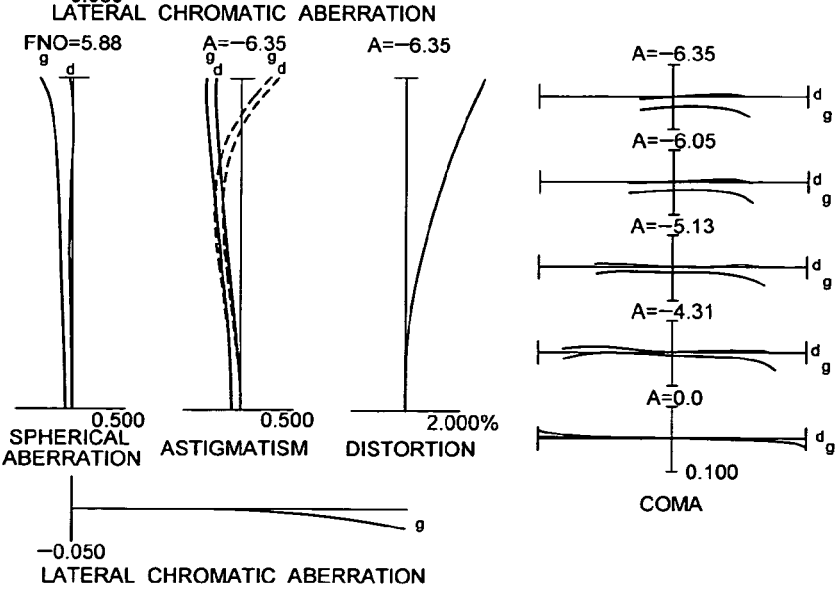

FIGS. 10A, 10B and 10C are graphs showing various aberrations of the zoom lens system according to Example 5 focusing on infinity in which FIG. 10A shows various aberrations in a wide-angle end state (f=18.5 mm), FIG. 10B shows various aberrations in an intermediate focal length state (f=50.0 mm), and FIG. 10C shows various aberrations in a telephoto end state (f=131.0 mm).

As is apparent from the respective graphs, the zoom lens system according to Example 5 shows superb optical performance as a result of good corrections to various aberrations in each focal length state.

EXAMPLE 6

Figure 11:
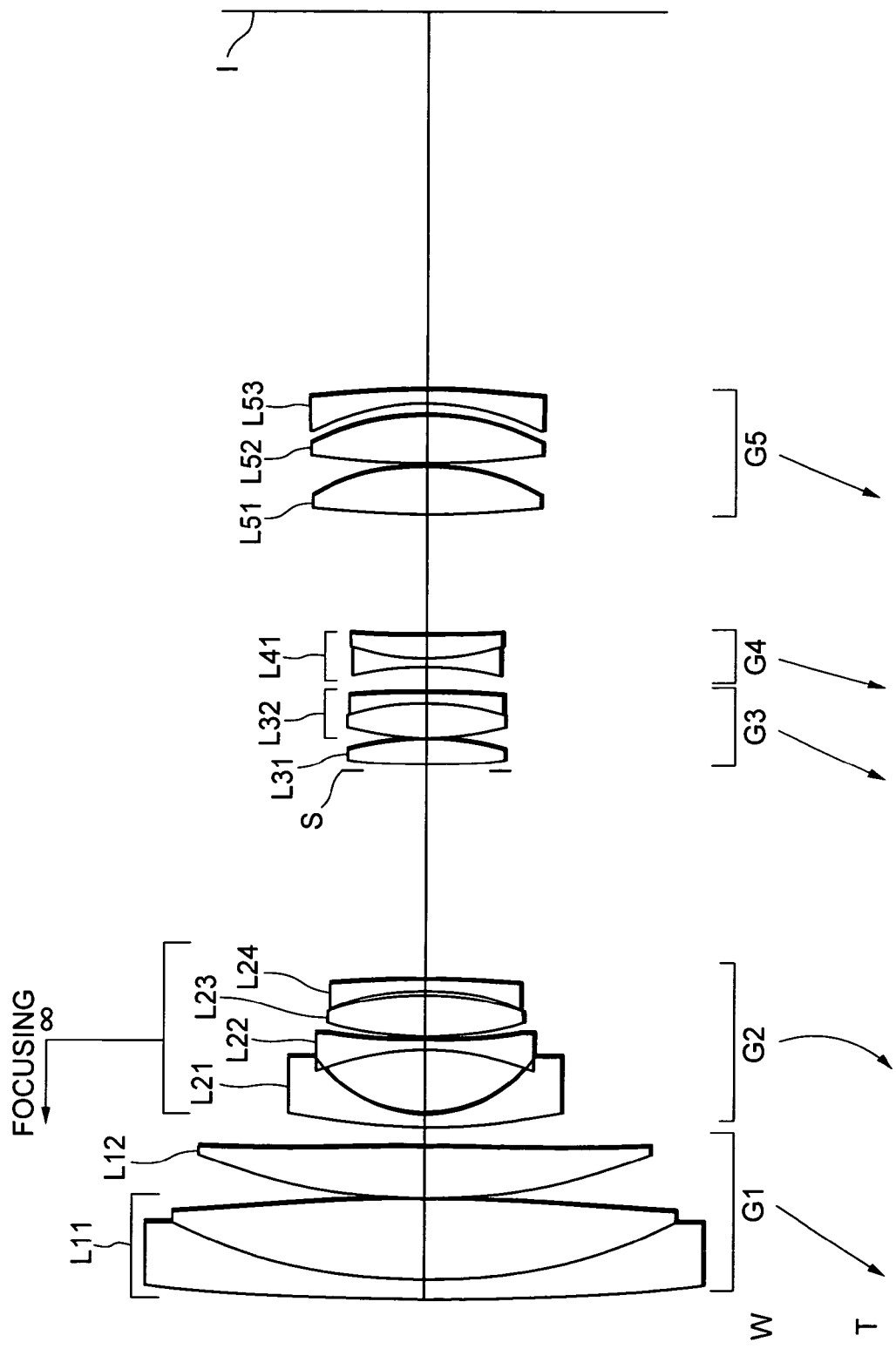
FIG. 11 is a diagram showing a lens configuration of a zoom lens system according to Example 6.

FIG. 11 is a diagram showing a lens configuration of a zoom lens system according to Example 6.

In FIG. 11, the zoom lens system according to Example 6 is composed of, in order from an object, a first lens group G1 having positive refractive power, a second lens group G2 having negative refractive power, a third lens group G3 having positive refractive power, a fourth lens group G4 having negative refractive power, and a fifth lens group G5 having positive refractive power. When a state of lens group positions varies from a wide-angle end state W to a telephoto end state T, a distance between the first lens group G1 and the second lens group G2 increases, a distance between the second lens group G2 and the third lens group G3 decreases, a distance between the third lens group G3 and the fourth lens group G4 increases, and a distance between the fourth lens group G4 and the fifth lens group G5 decreases.

The first lens group G1 is composed of a cemented lens L11 constructed by a negative meniscus lens having a convex surface facing the object cemented with a double convex positive lens, and a positive meniscus lens L12 having a convex surface facing the object.

The second lens group G2 is composed of a negative meniscus lens L21 having a convex surface facing the object, a double concave negative lens L22, a double convex positive lens L23, and a double concave negative lens L24.

The third lens group G3 is composed of a double convex positive lens L31, and a cemented lens L32 constructed by a double convex positive lens cemented with a negative meniscus lens having a concave surface facing the object.

The fourth lens group G4 is composed of a double concave negative lens L41, and a positive meniscus lens L42 having a convex surface facing the object.

The fifth lens group G5 is composed of a double convex positive lens L51, a double convex positive lens L52, and a negative meniscus lens L53 having a concave surface facing the object.

An aperture stop S is disposed at a position 0.4 mm separated to the object side from the most object side lens surface of the third lens group G3 and moved in a body with the third lens group G3 upon zooming from the wide-angle end state W to the telephoto end state T.

The negative meniscus lens L21 in the second lens group G2 has a thin resin layer having an aspherical surface on the object side lens surface. The negative meniscus lens L53 in the fifth lens group G5 has a thin resin layer having an aspherical surface on the object side lens surface.

The third lens group G3 and the fifth lens group G5 are moved along the same moving trajectory upon zooming from the wide-angle end state W to the telephoto end state T.

Focusing from infinity to a close object is carried out by moving the second lens group G2 to the object side.

Various values of the zoom lens system according to Example 6 are listed in Table 6.

TABLE 6

[Specifications]

|   | W | M | T |
|---|---|---|---|
| f = | 18.5 | 50.0 | 131.0 |
| FNO = | 3.6 | 4.9 | 5.9 |
| 2ω = | 80.7 | 32.0 | 12.6° |

[Lens Data]

|   | r | d | n | ν |
|---|---|---|---|---|
| 1 | 223.8523 | 2.00 | 1.80100 | 35.0 |
| 2 | 55.2795 | 8.10 | 1.48749 | 70.5 |
| 3 | −337.1774 | 0.10 |  |  |
| 4 | 58.3431 | 5.10 | 1.69680 | 55.5 |
| 5 | 612.9255 | (D5) |  |  |
| *6 | 62.8256 | 0.15 | 1.55389 | 38.1 |
| 7 | 59.8339 | 1.20 | 1.77250 | 49.6 |
| 8 | 13.3582 | 6.50 |  |  |
| 9 | −30.3165 | 1.00 | 1.78590 | 44.2 |

TABLE 6-continued

| 10 | 63.2494 | 0.30 |  |  |
|---|---|---|---|---|
| 11 | 32.1581 | 4.30 | 1.84666 | 23.8 |
| 12 | −32.1581 | 0.40 |  |  |
| 13 | −25.5055 | 1.00 | 1.79952 | 42.2 |
| 14 | 2360.3162 | (D14) |  |  |
| 15 | 49.7499 | 2.70 | 1.64000 | 60.1 |
| 16 | −34.8250 | 0.10 |  |  |
| 17 | 27.6293 | 3.70 | 1.48749 | 70.5 |
| 18 | −27.6293 | 1.00 | 1.84666 | 23.8 |
| 19 | −539.4372 | (D19) |  |  |
| 20 | −36.7502 | 1.00 | 1.77250 | 49.6 |
| 21 | 23.2312 | 0.09 |  |  |
| 22 | 23.8870 | 2.10 | 1.84666 | 23.8 |
| 23 | 92.1856 | (D23) |  |  |
| 24 | 106.3941 | 4.60 | 1.49782 | 82.6 |
| 25 | −24.6292 | 0.10 |  |  |
| 26 | 53.6511 | 5.20 | 1.48749 | 70.5 |
| 27 | −25.5245 | 1.20 |  |  |
| *28 | −24.8022 | 0.09 | 1.55389 | 38.1 |
| 29 | −23.6209 | 1.20 | 1.80100 | 35.0 |
| 30 | −113.9655 | (BF) |  |  |

[Aspherical Data]

Surface Number 6

κ = 1.0000
$C4 = 7.2110 \times 10^{-6}$
$C6 = -2.4658 \times 10^{-8}$
$C8 = 4.8081 \times 10^{-11}$
$C10 = -4.1934 \times 10^{-14}$ Surface Number 28

κ = 1.0000
$C4 = -1.1950 \times 10^{-5}$
$C6 = -1.9057 \times 10^{-9}$
$C8 = -1.2060 \times 10^{-10}$
$C10 = 6.8160 \times 10^{-13}$

[Variable Distances]

|   | W | M | T |
|---|---|---|---|
| f | 18.5 | 50.0 | 131.0 |
| D5 | 1.90 | 24.96 | 49.71 |
| D14 | 22.13 | 9.88 | 3.31 |
| D19 | 2.56 | 10.38 | 14.27 |
| D23 | 12.81 | 4.99 | 1.10 |

[Values for Conditional Expressions]

(1): f12W/X1 = −0.336
(2): X1/fW = 3.105

Figure 12A:
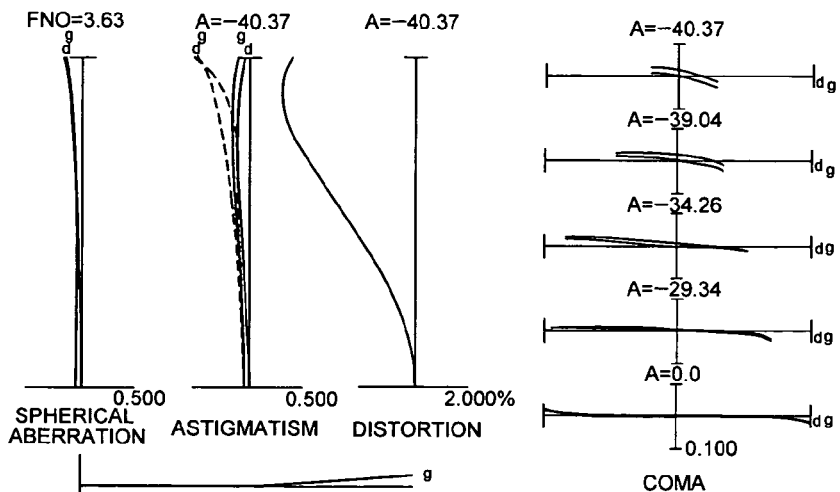
Figure 12B:
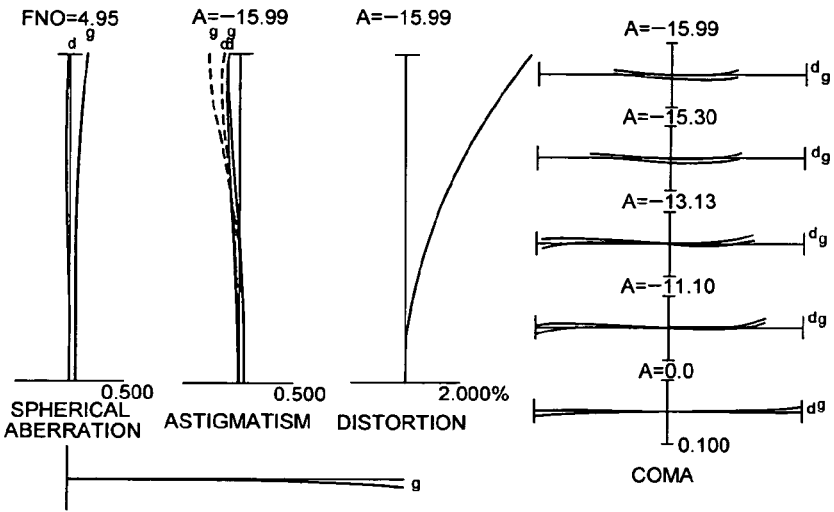
Figure 12C:
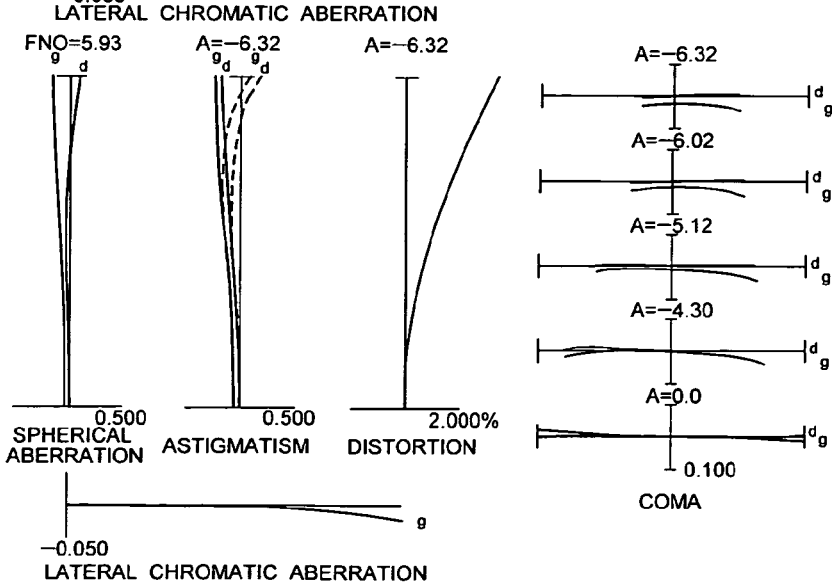

FIGS. 12A, 12B and 12C are graphs showing various aberrations of the zoom lens system according to Example 6 focusing on infinity in which FIG. 12A shows various aberrations in a wide-angle end state (f=18.5 mm), FIG. 12B shows various aberrations in an intermediate focal length state (f=50.0 mm), and FIG. 12C shows various aberrations in a telephoto end state (f=131.0 mm).

As is apparent from the respective graphs, the zoom lens system according to Example 6 shows superb optical performance as a result of good corrections to various aberrations in each focal length state.

EXAMPLE 7

FIG. 13 is a diagram showing a lens configuration of a zoom lens system according to Example 7.

In FIG. 13, the zoom lens system according to Example 7 is composed of, in order from an object, a first lens group G1 having positive refractive power, a second lens group G2 having negative refractive power, a third lens group G3 having positive refractive power, a fourth lens group G4 having negative refractive power, a fifth lens group G5 having positive refractive power, and a sixth lens group G6 having negative refractive power. When a state of lens group positions varies from a wide-angle end state W to a telephoto end state T, a distance between the first lens group G1 and the second lens group G2 increases, a distance between the second lens group G2 and the third lens group G3 decreases, a distance between the third lens group G3 and the fourth lens group G4 increases, a distance between the fourth lens group G4 and the fifth lens group G5 decreases, and a distance between the fifth lens group G5 and the sixth lens group G6 increases.

The first lens group G1 is composed of a cemented lens L11 constructed by a negative meniscus lens having a convex surface facing the object cemented with a double convex positive lens, and a positive meniscus lens L12 having a convex surface facing the object.

The second lens group G2 is composed of a negative meniscus lens L21 having a convex surface facing the object, a double concave negative lens L22, a double convex positive lens L23, and a negative meniscus lens L24 having a concave surface facing the object.

The third lens group G3 is composed of a double convex positive lens L31, and a cemented lens L32 constructed by a double convex positive lens cemented with a negative meniscus lens having a concave surface facing the object.

The fourth lens group G4 is composed of a double concave negative lens L41, and a positive meniscus lens L42 having a convex surface facing the object.

The fifth lens group G5 is composed of a double convex positive lens L51, and a cemented lens L52 constructed by a double convex positive lens cemented with a negative meniscus lens having a concave surface facing the object.

The sixth lens group G6 is composed of a negative meniscus lens L61 having a concave surface facing the object.

An aperture stop S is disposed at a position 0.5 mm separated to the object side from the most object side lens surface of the third lens group G3 and moved in a body with the third lens group G3 upon zooming from the wide-angle end state W to the telephoto end state T.

The negative meniscus lens L21 in the second lens group G2 has a thin resin layer having an aspherical surface on the object side lens surface. The cemented lens L52 in the fifth lens group G5 has a thin resin layer having an aspherical surface on the image plane I side lens surface.

The third lens group G3 and the fifth lens group G5 are moved along the same moving trajectory upon zooming from the wide-angle end state W to the telephoto end state T.

Focusing from infinity to a close object is carried out by moving the second lens group G2 to the object side.

Various values of the zoom lens system according to Example 7 of the present invention are listed in Table 7.

TABLE 7

[Specifications]

|   | W | M | T |
|---|---|---|---|
| f = | 18.5 | 50.0 | 131.0 |
| FNO = | 3.6 | 4.9 | 5.9 |
| 2ω = | 80.7 | 32.3 | 12.7° |

[Lens Data]

| | r | d | n | ν |
|---|---|---|---|---|
| 1 | 209.6422 | 2.00 | 1.80100 | 35.0 |
| 2 | 51.5283 | 8.30 | 1.48749 | 70.5 |

TABLE 7-continued

| 3 | −462.8887 | 0.10 | | |
| 4 | 55.2550 | 5.50 | 1.69680 | 55.5 |
| 5 | 587.3002 | (D5) | | |
| *6 | 96.3839 | 0.15 | 1.55389 | 38.1 |
| 7 | 73.9739 | 1.20 | 1.77250 | 49.6 |
| 8 | 13.6155 | 6.50 | | |
| 9 | −36.2865 | 1.00 | 1.79952 | 42.2 |
| 10 | 42.0067 | 0.10 | | |
| 11 | 28.5709 | 4.80 | 1.84666 | 23.8 |
| 12 | −32.0747 | 0.80 | | |
| 13 | −21.8196 | 1.00 | 1.78590 | 44.2 |
| 14 | −167.0770 | (D14) | | |
| 15 | 68.3479 | 2.70 | 1.62041 | 60.3 |
| 16 | −31.0076 | 0.10 | | |
| 17 | 25.3437 | 3.60 | 1.48749 | 70.5 |
| 18 | −29.8606 | 1.00 | 1.84666 | 23.8 |
| 19 | −639.6293 | (D19) | | |
| 20 | −32.1617 | 1.00 | 1.77250 | 49.6 |
| 21 | 25.2558 | 0.07 | | |
| 22 | 25.5354 | 2.30 | 1.80518 | 25.4 |
| 23 | 149.6527 | (D23) | | |
| 24 | 68.7863 | 5.10 | 1.49782 | 82.6 |
| 25 | −22.7752 | 0.10 | | |
| 26 | 72.2479 | 4.60 | 1.49782 | 82.6 |
| 27 | −27.9147 | 1.00 | 1.77250 | 49.6 |
| 28 | −36.0459 | 0.05 | 1.55389 | 38.1 |
| *29 | −34.3293 | (D29) | | |
| 30 | −29.1501 | 1.20 | 1.80100 | 35.0 |
| 31 | −109.0652 | (BF) | | |

[Aspherical Data]

Surface Number 6

κ = 1.0000
C4 = 1.1773 × 10$^{-5}$
C6 = −9.7337 × 10$^{-9}$
C8 = −7.9251 × 10$^{-11}$
C10 = 3.8347 × 10$^{-13}$

Surface Number 29

κ = 1.0000
C4 = 1.2318 × 10$^{-5}$
C6 = 3.1586 × 10$^{-8}$
C8 = −1.5661 × 10$^{-10}$
C10 = 6.4193 × 10$^{-13}$

[Variable Distances]

| | W | M | T |
|---|---|---|---|
| f | 18.5 | 50.0 | 131.0 |
| D5 | 2.10 | 24.69 | 49.82 |
| D14 | 20.47 | 8.74 | 2.50 |
| D19 | 2.71 | 10.05 | 13.21 |
| D23 | 11.50 | 4.16 | 1.00 |
| D29 | 1.71 | 2.22 | 2.43 |

[Values for Conditional Expressions]

(1): f12W/X1 = −0.292
(2): X1/fW = 3.204

Figure 14A:
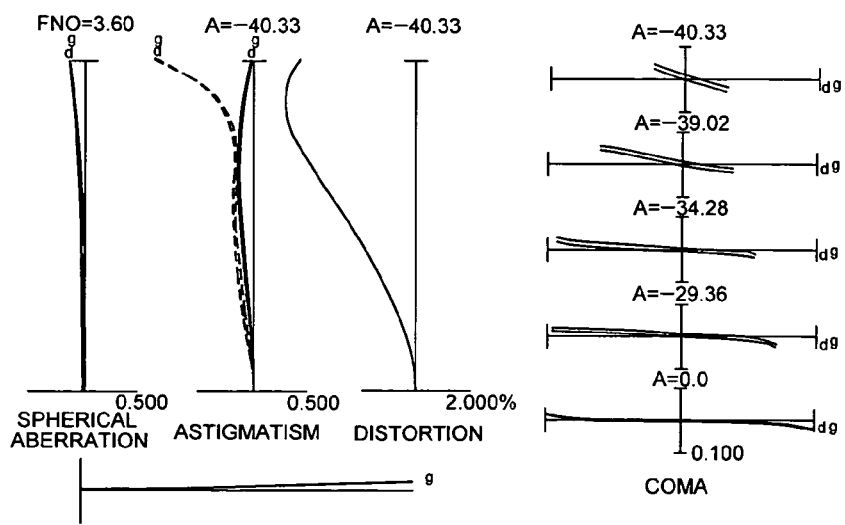
Figure 14B:
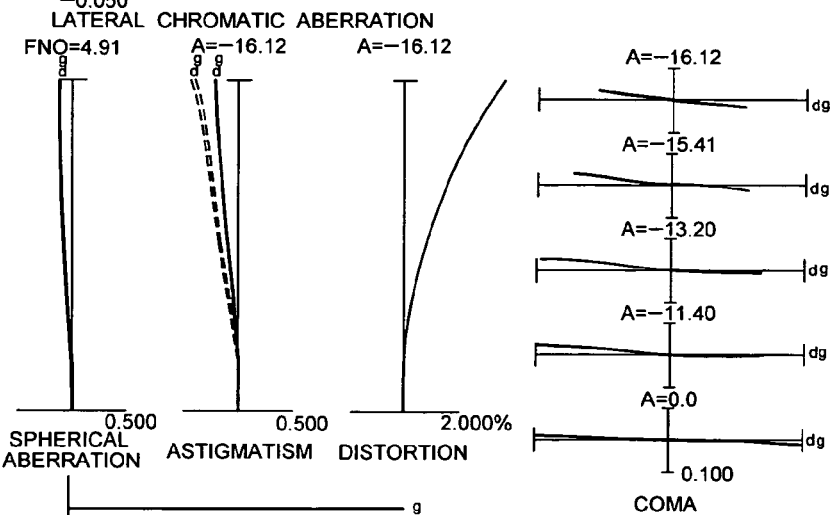
Figure 14C:
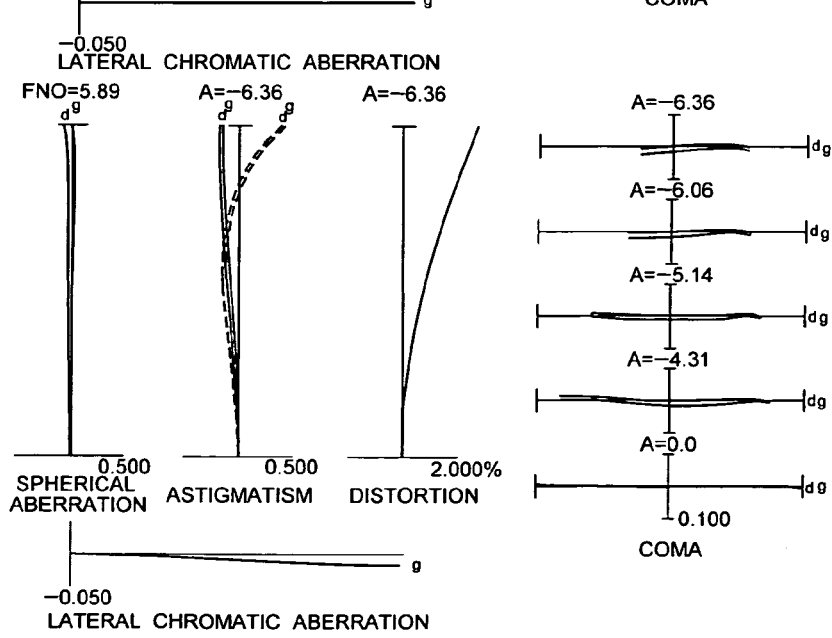

FIGS. 14A, 14B and 14C are graphs showing various aberrations of the zoom lens system according to Example 7 focusing on infinity in which FIG. 14A shows various aberrations in a wide-angle end state (f=18.5 mm), FIG. 14B shows various aberrations in an intermediate focal length state (f=50.0 mm), and FIG. 14C shows various aberrations in a telephoto end state (f=131.0 mm).

As is apparent from the respective graphs, the zoom lens system according to Example 7 shows superb optical performance as a result of good corrections to various aberrations in each focal length state.

As described above, with properly arranging refractive power, the present invention makes it possible to provide a zoom lens system suitable for obtaining a high zoom ratio with preferably correcting aberrations over entire focal length range from the wide-angle end state to the telephoto end state.

In all Examples, although focusing from infinity to a close object is carried out by moving the second lens group G2, any lens group other than the second lens group G2 may be used for focusing.

In all Examples, although the aperture stop S is disposed between the second lens group G2 and the third lens group G3, the aperture stop S may be disposed other space such as a space between the third lens group G3 and the fourth lens group G4, or a space within a lens group such as the third lens group G3.

In Examples 1 and 2, an aspherical surface is used in the second lens group G2 and, in Examples 3 through 7, an aspherical surface is used in each of the second lens group G2 and the fifth lens group G5 so as to effectively correct aberrations, in particular, curvature of field and distortion. However, an aspherical surface may be used in a lens group other than the second lens group G2 and the fifth lens group G5.

In all Examples, in order to prevent an image blur caused by a camera shake or the like liable to happen upon shooting with a high zoom ratio zoom lens system, the zoom lens system may be made to be a vibration reduction optical system in the following manner that a detector for detecting a camera shake and a driver are combined with the zoom lens system, a lens group or a portion of a lens group composing the zoom lens system is designated as a decentering lens group, a camera shake is detected by the detector, and the detected camera shake is corrected by decentering the decentering lens group to shift an image in a direction to correct the image blur by means of the driver.

In all Examples, a diffractive optical element may be used. By using a diffractive optical element, chromatic aberration, in particular, can be preferably corrected.

It is needless to say that although a zoom lens system with a five-lens-group configuration or a six-lens-group configuration is shown as an example of each Example of the present invention, a zoom lens system simply added by a lens group to a five-lens-group configuration or a six-lens-group configuration is included in the spirit of the present invention. Moreover, in the configuration of each lens group, a lens group simply added by additional lens elements to the lens group shown in each Example is included in the spirit or scope of the present invention.

Additional advantages and modifications will readily occur to those skilled in the art. Therefore, the invention in its broader aspect is not limited to the specific details, and representative devices shown and described herein. Accordingly, various modifications may be made without departing from the spirit or scope of the general inventive concept as defined by the appended claims and their equivalents.

What is claimed is:

1. A zoom lens system comprising, in order from an object:
    a first lens group having positive refractive power;
    a second lens group having negative refractive power;
    a third lens group having positive refractive power;
    a fourth lens group having negative refractive power; and
    a fifth lens group having positive refractive power;
    when a state of lens group positions varies from a wide-angle end state to a telephoto end state, a distance between the first lens group and the second lens group increasing, a distance between the second lens group and the third lens group decreasing, a distance between the third lens group and the fourth lens group increasing, a distance between the fourth lens group and the fifth lens group decreasing; and
    the following conditional expression being satisfied:

$$-0.37 < f12W/X1 < -0.20$$

where f12W denotes a combined focal length of the first lens group and the second lens group in the wide-angle end state upon focusing on infinity, and X1 denotes a moving amount of the first lens group upon zooming from the wide-angle end state to the telephoto end state.

2. The zoom lens system according to claim 1, wherein the following conditional expression is satisfied:

$$2.32 < X1/fW$$

where fW denotes a focal length of the zoom lens system in the wide-angle end state.

3. The zoom lens system according to claim 2, wherein the third lens group is composed of, in order from the object, a positive lens element, a positive lens element and a negative lens element.

4. The zoom lens system according to claim 1, wherein the third lens group is composed of, in order from the object, a positive lens element, a positive lens element and a negative lens element.

5. The zoom lens system according to claim 1, wherein the first lens group includes, in order from the object, a cemented lens, and a positive lens.

6. The zoom lens system according to claim 1, wherein the second lens group includes, in order from the object, a negative lens, a negative lens, a positive lens, and a negative lens.

7. The zoom lens system according to claim 1, wherein the fourth lens group includes a positive lens and a negative lens.

8. The zoom lens system according to claim 1, wherein the fifth lens group includes, in order from the object, a positive lens, a positive lens, and a negative lens.

9. The zoom lens system according to claim 1, wherein an aperture stop is disposed between the second lens group and the third lens group.

10. The zoom lens system according to claim 1, wherein at least one surface of the second lens group is an aspherical surface.

11. The zoom lens system according to claim 1, wherein at least one surface of the fifth lens group is an aspherical surface.

12. The zoom lens system according to claim 1, wherein the third lens group and the fifth lens group are moved along the same moving trajectory upon zooming from the wide-angle end state to the telephoto end state.

13. The zoom lens system according to claim 1, wherein focusing from infinity to a close object is carried out by moving the second lens group to the object side.

14. A method for forming an image of an object and varying a focal length of a zoom lens system that includes, in order from the object, a first lens group having positive refractive power, a second lens group having negative refractive power, a third lens group having positive refractive power, a fourth lens group having negative refractive power, and a fifth lens group having positive refractive power, comprising steps of:
    varying the focal length by increasing a distance between the first lens group and the second lens group, decreasing a distance between the second lens group and the third lens group, increasing a distance between the third lens group and the fourth lens group, and decreasing a distance between the fourth lens group and the fifth lens group when the zoom lens system moves from a wide-angle end state to a telephoto end state; and satisfying the following conditional expression:

$$-0.37 < f12W/X1 < -0.20$$

where f12W denotes a combined focal length of the first lens group and the second lens group in the wide-angle end state upon focusing on infinity, and X1 denotes a moving amount of the first lens group upon zooming from the wide-angle end state to the telephoto end state.

15. The method for forming an image of an object and varying a focal length of a zoom lens system according to claim 14, further comprising a step of:

satisfying the following conditional expression:

$$2.32 < X1/fW$$

where fW denotes a focal length of the zoom lens system in the wide-angle end state.

16. The method for forming an image of an object and varying a focal length of a zoom lens system according to claim 14, further comprising a step of:

providing the third lens group composed of, in order from the object, a positive lens element, a positive lens element and a negative lens element.

* * * * *